(12) United States Patent
Ter Huurne et al.

(10) Patent No.: US 9,874,411 B2
(45) Date of Patent: Jan. 23, 2018

(54) SCRAPING HEAT EXCHANGER

(75) Inventors: Niels Ter Huurne, Rietmolen (NL);
Ronald Buitenhuis, Eefde (NL);
Gerardus Cornelius Maria Van Der Ven, Zeeland (NL); Franciscus Johannes Cornelis Smeltink, Werverhoof (NL); Gerrit Hendrik Van Aartsen, Nijverdal (NL)

(73) Assignee: TERLET B.V., Zutphen (NL)

( * ) Notice: Subject to any disclaimer, the term of this patent is extended or adjusted under 35 U.S.C. 154(b) by 850 days.

(21) Appl. No.: 13/876,701

(22) PCT Filed: Oct. 3, 2011

(86) PCT No.: PCT/NL2011/050669
§ 371 (c)(1),
(2), (4) Date: Jul. 12, 2013

(87) PCT Pub. No.: WO2012/044172
PCT Pub. Date: Apr. 5, 2012

(65) Prior Publication Data
US 2013/0306270 A1    Nov. 21, 2013

(30) Foreign Application Priority Data

Oct. 1, 2010 (NL) .................................... 2005442
Oct. 1, 2010 (NL) .................................... 2005443
(Continued)

(51) Int. Cl.
*F25C 1/14* (2006.01)
*F28F 19/00* (2006.01)
*B01D 1/22* (2006.01)
(Continued)

(52) U.S. Cl.
CPC ............ *F28F 19/008* (2013.01); *B01D 1/225* (2013.01); *F28F 3/14* (2013.01); *F25C 1/14* (2013.01);
(Continued)

(58) Field of Classification Search
CPC .................... F28F 19/008; F25C 1/142–1/147
(Continued)

(56) References Cited

U.S. PATENT DOCUMENTS 2,638,329 A * 5/1953 Weygand et al. ........ A23G 1/18
165/94
3,206,287 A * 9/1965 Crawford ................. A23D 9/02
165/147

(Continued)

FOREIGN PATENT DOCUMENTS

DE     25 49 600 A1    5/1977
DE    101 46 394 A1    5/2002
(Continued)

OTHER PUBLICATIONS espacenet English abstract of NL 7809531 A.

*Primary Examiner* — Allen Flanigan
(74) *Attorney, Agent, or Firm* — Ladas & Parry LLP

(57) ABSTRACT

The invention relates to improvements of a scraping heat exchanger having an outer cylinder comprising a first wall having a smooth circle-cylindrical inner side, and an inner cylinder positioned concentrically within it. The improvements regard a simple detachable inner cylinder, a heat exchanger with lid including a fluid barrier, a heat exchanger with a tangential output, and a method and heat exchanger adapted for improved evacuation of a product chamber of a heat exchanger.

25 Claims, 18 Drawing Sheets

(30) Foreign Application Priority Data

Oct. 1, 2010 (NL) .................................... 2005444
Oct. 1, 2010 (NL) .................................... 2005445

(51) Int. Cl.
*F28F 3/14* (2006.01)
*F28D 21/00* (2006.01)

(52) U.S. Cl.
CPC .. *F28D 2021/0042* (2013.01); *F28F 2230/00* (2013.01); *F28F 2265/16* (2013.01); *F28F 2275/20* (2013.01); *F28F 2280/02* (2013.01); *Y10T 29/4935* (2015.01)

(58) Field of Classification Search
USPC ............................................. 165/94; 62/354
See application file for complete search history.

(56) References Cited

U.S. PATENT DOCUMENTS

| | | | | |
|---|---|---|---|---|
| 3,238,739 A | * | 3/1966 | Ross | F25C 1/142 62/298 |
| 3,476,522 A | * | 11/1969 | Stovall | B01F 7/00208 165/94 |
| 3,633,664 A | * | 1/1972 | Walsh et al. | A23G 9/12 165/94 |
| 4,105,066 A | | 8/1978 | Buhler | |
| 4,126,177 A | * | 11/1978 | Smith et al. | F28F 19/008 165/109.1 |
| 4,282,925 A | * | 8/1981 | Hay et al. | F28F 19/008 165/109.1 |
| 4,941,529 A | | 7/1990 | Boer | |
| 5,228,503 A | * | 7/1993 | Smith | F28F 19/008 165/85 |
| 5,957,041 A | * | 9/1999 | Fosbol et al. | A23K 10/26 165/109.1 |
| 6,658,889 B2 | * | 12/2003 | Krylov | C02F 1/22 62/544 |

FOREIGN PATENT DOCUMENTS

| | | |
|---|---|---|
| NL | 47 681 C | 8/1939 |
| NL | 7809531 A | 3/1979 |
| NL | 8 701 906 A | 3/1989 |

* cited by examiner

SCRAPING HEAT EXCHANGER

RELATED APPLICATION INFORMATION

This application is a 371 of International Application PCT/NL2011/050669 filed 3 Oct. 2011 entitled "Improvements to a Scraping Heat Exchanger", which was published in the English language on 5 Apr. 2012, with International Publication Number WO 2012/044172 A2, and which claims priority from Netherlands Patent Applications Nos. 2005442 filed Oct. 1, 2010, 2005443 filed Oct. 1, 2010, 2005444 filed Oct. 1, 2010, and 2005445, filed Oct. 1, 2010, the contents of which are incorporated herein by reference.

BACKGROUND OF THE INVENTION

The invention relates to a heat exchanger, particularly a scraping heat exchanger having an outer cylinder comprising a first wall having a smooth circle-cylindrical inner side, and an inner cylinder positioned concentrically therewithin, comprising a second wall having a smooth circle-cylindrical outer side, wherein both sides together define a vertically arranged space for cooling and/or heating a liquid and/or viscous product.

The heat exchanger can be used for all kinds of purposes, such as for instance preparing jam. In that case it should be avoided as much as possible that the fruit breaks down into pieces. Other examples of products are mayonnaise, soft filling for cookies, dairy products, but also ink for printers.

Such a heat exchanger is described in Dutch patent Nr. 8701906. As the inner side and outer side are scraped the inner side and/or outer side are subject to wear, particularly when metal scrapers are used. Among others when the outer side of the inner cylinder is worn the heat exchanger can no longer be used. If replacing the inner cylinder is possible at all, it is a difficult and laborious job as this cylinder is hard to reach and often is welded to a flange at a lower side of the heat exchanger which substantially closes off the vertically arranged space at a lower side.

When treating pollution-sensitive materials, such as food products and/or medical products, there is also the risk of air or polluting particles from outside of the space end up in the heat exchanger in the space. This is particularly the case when a sealing between the space in the heat exchanger and the space outside of it shows defects.

A further drawback of the known heat exchanger is that product gets lost when the space is not sufficiently filled. In a known method, after ending the product supply, the product is discharged from the chamber at a lower side; the treatment of the product in the heat exchanger is not yet completed at that moment so that this part of the product is not suitable for further processing. This results in loss of product.

It is an object of the invention to at least partially solve at least one of the above-mentioned problems.

SUMMARY OF THE INVENTION

According to a first aspect the present invention intends to provide a scraping heat exchanger of which the inner cylinder can easily be replaced.

According to this first aspect the invention provides a scraping heat exchanger comprising an outer cylinder comprising a first wall having a smooth circle-cylindrical inner side, and an inner cylinder positioned concentrically therewithin, comprising a second wall having a smooth circle-cylindrical outer side, wherein both side together define a substantially vertically arranged space for cooling and/or heating a liquid and/or viscous product, further comprising a driving shaft positioned in the centre line of the concentric walls, an upper wall that substantially closes off the inner cylinder at an upper side, and a number of arms that are coupled to the shaft, wherein scraping members are attached to the arms, which scraping members are adapted for scraping over the inner side and/or outer side during rotation of the shaft, wherein the second wall is designed at least partially hollow and comprises a supply connection and a discharge connection for supplying and discharging, respectively, a cooling medium and/or heating medium and is adapted for the cooling medium and/or heating medium flowing through it, wherein the heat exchanger further comprises a flange adapted for with an upper side abutting a lower side of the inner cylinder and for substantially sealing off the lower side of the space, and comprises attachment means adapted for detachably pushing the upper side of the flange against the lower side of the inner cylinder. In that way the inner cylinder can be replaced and/or serviced independent from the outer cylinder. When the flange and the inner cylinder are pushed against each other the flange substantially closes off the lower side of the space, whereas when the flange and the inner cylinder have been detached from each other the inner cylinder can easily be removed from the heat exchanger. This can for instance be done by moving the detached inner cylinder in a direction with a sideward component with respect to its centre line when also the outer cylinder has been removed from the heat exchanger, and/or by moving the detached inner cylinder substantially parallel to its centre line away from the flange. Subsequently the inner cylinder can be serviced, and/or a new inner cylinder can be placed in the heat exchanger in a comparable manner but in reversed order. When the inner cylinder has been taken out of the heat exchanger the inner side of the heat exchanger can easily be reached for servicing and inspection.

In one embodiment the driving shaft passes through the upper wall and the arms are attached to the shaft above the upper wall.

In one embodiment the upper wall at a lower side is provided with further attachment means extending within the inner cylinder and through through-holes in the flange, wherein said attachment means are adapted for detachably pushing the upper wall against an upper side of the inner cylinder and for from the lower side of the flange being fastened and/or loosened. Preferably the lower side of the upper wall is provided with a number of holes that are not through-going and that are provided with internal thread. In that way the upper wall can be pushed against the inner cylinder from the lower side of the flange by at the lower side of the flange screwing bolts into said holes. Due to the quickly and easily detachable upper wall the interior of the inner cylinder can easily be inspected, and also the sealing between the upper wall and the inner cylinder and/or a sealing between the upper wall and the driving shaft can easily be serviced and replaced.

In one embodiment at a side facing away from the flange the outer cylinder comprises a closable opening through which the inner cylinder can be moved. In that way the inner cylinder can be removed from the heat exchanger independent from both the outer cylinder and the flange.

In one embodiment the scraping heat exchanger further comprises a lid movable to a first position in which it substantially closes off an upper side of the space, and movable to a second position in which it leaves an upper side of the heat exchanger open such that the inner cylinder can be moved through it. The lid preferably is hinged with respect to the outer cylinder. When the lid is in the second position, inspections of and/or servicing activities to the interior of the heat exchanger can easily be carried out. Moreover, when the attachment means do not push the inner cylinder against the flange and when the lid is in the second position, the inner cylinder can easily be removed from the heat exchanger via the upper side of the heat exchanger. In addition during removal of the inner cylinder, the flange can remain in its place with respect to a floor surface on which the heat exchanger supports.

In one embodiment the attachment means are adapted for from the lower side of the flange being fastened and/or loosened, and for preferably forming a screw joint. The lower side of the flange preferably is, either freely or not, accessible from the outside of the heat exchanger so that the inner cylinder can quickly be fastened to and/or detached from the flange.

In one embodiment the flange is provided with a first series of through-holes for at least partially passing the attachment means through from an upper side to the lower side of the flange or vice versa. In one embodiment the inner cylinder is provided with through-holes at its lower side as well, which through-holes, when the inner cylinder is placed on the flange, connect to the first series of through-holes. In that case for instance bolts and nuts can be used for clamping the inner cylinder detachably against the flange, wherein the nuts preferably are tightened or loosened from the lower side of the flange. Alternatively the lower side of the inner cylinder can be provided with a number of holes provided with internal thread, wherein said holes, when the inner cylinder is placed on the flange, connect to the first series of holes. In the latter case screwing the bolts from the lower side of the flange into the lower side of the inner cylinder suffices for pushing the inner cylinder against the flange.

In one embodiment the attachment means comprise threaded ends that protrude from the lower side of the inner cylinder and fit through the holes of the first series of through-holes, wherein the attachment means further comprise nuts to screw onto the threaded ends. The threaded ends are also of further use in aligning the inner cylinder on the flange during placing the inner cylinder.

In one embodiment at an upper side the flange is provided with a mounting surface for placing the inner cylinder thereon, wherein the first series of through-holes is located in the mounting surface. The mounting surface preferably corresponds with an annular lower edge of the inner cylinder and within it comprises a passage for passing through the driving shaft and/or supply ducts and discharge ducts for the cooling medium and/or heating medium. The through-holes of the first series preferably extend at right angles to the mounting surface.

In one embodiment the supply connection and/or the discharge connection protrudes from the lower side of the inner cylinder and extends through one or two further through-holes in the flange, wherein the one or two further through-holes preferably debouch in the mounting surface. Connections for the heat exchange medium can in that way be connected from the easily accessible lower side of the flange to ducts for the supply and discharge of medium.

In one embodiment the outer cylinder is detachably attached to the flange, preferably by means of attachment means which extend from a lower side of the flange through a second series of through-holes in the flange to a lower side of the outer cylinder. In that way the outer cylinder can be replaced and/or serviced independent from the inner cylinder.

In one embodiment the heat exchanger comprises a motor for driving the driving shaft, wherein the motor preferably is placed within the inner cylinder, and during heat exchanging use of the heat exchanger preferably is attached to the flange. The motor can be provided with power via electric wires that go through a through-opening in the flange, so that the flange needs to be provided with a larger through-opening for the driving shaft. In case of heating heat exchangers the heat of the motor can contribute to the heating of the product. In case of cooling heat exchangers the cooling medium flowing through the inner cylinder contributes to cooling the motor. Individual provisions for preventing the motor from getting overheated therefore are not necessary. In one embodiment the motor is placed at a side of the flange that faces away from the space.

Summarising the invention according to the first aspect relates to a scraping heat exchanger having a detachable inner cylinder, wherein at its lower side the heat exchanger comprises a flange on which the inner cylinder can be placed, further comprising attachment means for from a lower side of the flange detachably attaching the inner cylinder on an upper side of the flange in a clamping manner.

According to a second aspect the invention provides a method for on a mounting surface at an upper side of a flange placing an inner cylinder in a scraping heat exchanger, which flange is adapted for at least partially closing off the heat exchanger at a lower side, wherein the flange is provided with a first series of through-holes extending from the mounting surface at the upper side of the flange to a lower side of the flange, the method comprising: placing the inner cylinder on the mounting surface, and subsequently from a lower side of the flange detachably fastening attachment means that at least partially extend through the first series of through-holes and are adapted for pushing a lower side of the inner cylinder against the upper side of the flange. The method which is preferably carried out while an outer cylinder has been mounted on the flange, makes it possible to place an inner cylinder in a simple and quick manner in a scraping heat exchanger. In order to be able to remove an inner cylinder out of the heat exchanger first the attachment means at the lower side of the flange need to be loosened.

In one embodiment the inner cylinder is placed from an open upper side of the heat exchanger.

In one embodiment the method is carried out while an outer cylinder has been mounted on the flange.

According to a third aspect the invention intends to provide a scraping heat exchanger with a sealing of improved reliability.

According to said third aspect the invention provides a scraping heat exchanger comprising a first wall having a smooth circle-cylindrical inner side, and a second wall positioned concentrically therewithin having a smooth circle-cylindrical outer side, wherein both sides together define a substantially vertically arranged space for a product to be cooled and/or heated to a first temperature, further comprising a driving shaft positioned in the centre line of the concentric walls, which shaft is bearing-mounted in a bearing housing and is substantially sealed with respect to an upper wall that substantially closes off the second wall at an upper side, and a number of arms that are coupled to the shaft, wherein scraping members are attached to the arms, which scraping members are adapted for scraping over the inner side and/or outer side during rotation of the shaft, wherein at an upper side the first wall is provided with a first edge having an upper side, and the heat exchanger is furthermore provided with a lid with a second edge having a lower side, which lid is moveable between a first position in which the lid substantially closes off the upper side of the first wall, and a second position in which the lid leaves the upper side of the first wall substantially open, wherein the heat exchanger further comprises two spaced apart sealings, which at least when the lid is in the first position, are placed stationary and concentrically and abut the upper side of the first edge and the lower side of the second edge thus defining a circumferential space, wherein the heat exchanger further comprises a supply duct for supplying a fluid, such as steam, under overpressure, to the circumferential space, and a discharge duct for discharging the fluid from the circumferential space. The fluid preferably is a sterile fluid. The overpressure ensures that air, particularly non-sterile air, from outside of the heat exchanger does not go to the space for treating the product, even if one of the sealings between the lid and the edge of the first wall do not entirely connect. In that way an improved sealing is provided between the lid and the first wall, which is particularly suitable for heat exchangers of which the space for the product to be treated needs to remain aseptic. The aseptic sealing between the lid and the first wall during operational use, i.e. when the product is being treated in the space for the product, together with the circumferential space and the fluid supplied thereto form a static fluid lock.

It is noted that Dutch patent application 7809531 of the applicant describes a scraping heat exchanger comprising a first wall having a smooth circle-cylindrical inner side, and a second wall positioned concentrically therewithin having a smooth circle-cylindrical outer side, wherein both sides together define a substantially vertically arranged space for a liquid and/or viscous product to be cooled and/or heated, further comprising a driving shaft positioned in the centre line of the concentric walls, which shaft is bearing mounted in a bearing housing, and passes through an upper wall that substantially closes off the second wall at an upper side, a number of arms, which are attached to the shaft above the upper wall, wherein scraping members are attached to the arms which scraping members are adapted for scraping over the inner side and/or outer side during rotation of the shaft. The sealing above the bearing is in that case a conventional sealing of for instance elastic material that is pushed against the shaft circumference.

In one embodiment the scraping heat exchanger further comprises a pump that is connected to the supply duct, wherein the pump is adapted for substantially continuously supplying fluid for flushing the circumferential space when the lid is in the first position.

In one embodiment the first or second edge, at least when the lid is in the first position, comprises a through-opening extending from an outside of said edge to the circumferential space thus forming the supply duct, wherein the first or second edge comprises a through-opening extending from the circumferential space to an outside of said edge, thus forming the discharge duct. The supply duct and the discharge duct preferably are disposed in the first edge so that they do not need to move along when the lid moves with respect to the first edge.

In one embodiment at least one of the edges is provided with a circumferential groove which, when the lid is in the first position, is placed concentrically between the two sealings and forms a part of the circumferential space. In that way a circumferential space of a larger volume is provided, without using correspondingly larger sealings. In one embodiment both edges are provided with such a groove.

In one embodiment at least one of the edges is provided with an abutment edge for keeping the upper side of the first edge and the lower side of the second edge spaced apart when the lid is in the first position. Damage to the sealings due to too large a pressure of the lid thereon is thus counteracted.

In one embodiment the heat exchanger further comprises a pressure meter that is connected to the discharge duct and connected to alarm means that are adapted for giving an alarm signal when the pressure of the discharged fluid measured by the pressure meter is beyond a predetermined threshold range. The threshold range can for instance be determined by measuring the pressure of discharged fluid when the sealings have just been checked and the lid is in the first position, wherein the threshold range for instance comprises the then measured pressure ±10% as range. The alarm means are then adapted for giving an alarm signal in case of more than 10% overpressure with respect to the pressure measured earlier, for instance when the discharge duct is clogged, and/or in case of more than 10% underpressure with respect to the pressure measured earlier, for instance when the sealings do not sufficiently seal off the circumferential space.

According to a fourth aspect the invention intends to provide a treatment device having an outlet that damages the product as little as possible.

According to this fourth aspect the invention provides a scraping heat exchanger comprising an outer cylinder comprising a first wall having a smooth circle-cylindrical inner side, and an inner cylinder positioned concentrically therewithin, comprising a second wall having a smooth circle-cylindrical outer side, wherein both sides together define a substantially vertically arranged space for a product to be cooled and/or heated, further comprising a driving shaft positioned in the centre line of the concentric walls, an upper wall that closes off the inner cylinder at an upper side, and a number of arms that are coupled to the shaft, wherein scraping members are attached to the arms, which scraping members are adapted for scraping over the inner side and/or outer side during rotation of the shaft, wherein a tubular supply connection for the product to be heated and/or cooled debouches in the lower side of the space, and a tubular discharge connection for the heated and/or cooled product debauches in the upper side of the space, wherein when viewed in horizontal projection the discharge connection tangentially debouches in the space, and wherein the discharge connection is at an oblique angle of elevation to the horizontal plane. The product flow in the heat exchanger runs from bottom to top, wherein the product also moves along with the rotation direction of the scrapers. When reaching the discharge connection at the upper side of the space the product flow thus has a vertical component of velocity and also a horizontal component of velocity that is substantially tangential to the circular movement of the product flow. As the exit of the tubular discharge connection in the space is substantially aligned with both the horizontal and the vertical component of velocity of the product flow, damaging the product when entering the discharge connection, for instance due to swirls in the product flow and/or the product colliding with the upper side of the heat exchanger, is counteracted. Additionally the present invention promotes that parts of which the product flow is composed leave the space in the order of arrival in the space. In that way it is achieved that the period of time that said parts of the product flow in the space are cooled and/or heated is substantially uniform, at least more uniform than in the known devices.

It is noted that U.S. Pat. No. 4,941,529 describes a scraping heat exchanger wherein the supply connection for the product to be treated debouches tangentially in an annular chamber below in the space. Thus when entering the space the product flow, for instance comprising a viscous liquid having pieces of fruit therein, is given a component of velocity in the rotary direction of the scraper blades, which limits damage to the product. When the product leaves the chamber at the upper side of the chamber, the flow of the product is changed abruptly however, so that swirls in the product flow and the product colliding with the upper side of the chamber may as yet damage the product.

In one embodiment the driving shaft passes through the upper wall and the arms are attached to the shaft above the upper wall.

In one embodiment the discharge connection follows a helical line extending about the centre line. In that way, when entering the discharge connection, the product flow can substantially continue a helical line it followed within the space. Additionally a discharge connection is thus provided having a tangential component in the horizontal plane which, when viewed in horizontal projection, projects little or not beyond a hull defined by the outer cylinder. In that way the heat exchanger can be designed more compact.

In one embodiment the radius of the helical line substantially equals an average of a radius of the inner side of the outer cylinder and the radius of the outer side of the inner cylinder. In that way the discharge connection substantially follows the direction of the product flow when it flows between the inner side and the outer side.

In one embodiment discharge connection has a radius that substantially equals the distance of the helical line to the inner side and/or outer side, so that the diameter of the discharge connection substantially equals the distance between the inner side and the outer side. In that way a proper flow-through of the product can be achieved without considerably accelerating the product flow in the discharge connection. Preferably the radius or the diameter of the discharge connection equals the radius or the diameter of the supply connection. In one embodiment the radius of the discharge connection exceeds or equals the distance of the helical line to the inner side and/or outer side.

In one embodiment the scraping heat exchanger further comprises a lid comprising the discharge connection, wherein the lid is adapted for, at least in a closed position, substantially closing off the upper side of the outer cylinder. When viewed in horizontal projection when the lid is in the closed position, the discharge connection preferably remains substantially within the further surface of the lid.

In one embodiment the discharge connection is disposed on an upper side of the heat exchanger. In an alternative embodiment the discharge connection is disposed at a side of the heat exchanger.

In one embodiment the lid is adapted for rotation about the centre line, and when viewed in horizontal projection, an angle of rotation between the supply connection and the discharge connection is adjustable by rotating the lid about the centre line. Angle of rotation here means the angle in case of projection in the horizontal plane between a centre line of the supply connection where it debouches in the space and a centre line of the discharge connection where said discharge connection debouches in the space.

In one embodiment the angle of elevation of the discharge tube is between 10 degrees and 45 degrees, preferably between 10 and 30 degrees, and most preferably the angle of elevation is 25 degrees. Angle of elevation in this case means an angle between the horizontal plane and the centre line of the discharge tube where it debouches in the space.

In one embodiment the supply connection, when viewed in horizontal projection, debouches tangentially in the space, wherein the discharge connection, where it debouches in the space, has an oblique angle of elevation.

Summarising the invention according to the fourth aspect provides a scraping heat exchanger adapted for cooling and/or heating a product in a vertically arranged space, wherein a tubular supply connection for supply of the product to be heated and/or cooled debouches in the lower side of the space, and a tubular discharge connection for discharge of the heated and/or cooled product debouches in the upper side of the space, wherein the discharge connection, when viewed in horizontal projection, tangentially debouches in the space, wherein the discharge connection is at an oblique angle of elevation to the horizontal plane.

According to a fifth aspect the invention relates to a method for recovering product from a vertically arranged heat exchanger, particularly from a scraping heat exchanger. In such heat exchangers a liquid and/or viscous product is supplied to a heat exchanging chamber via an opening in a lower side of the heat exchanger, in which chamber the product is heated and/or cooled and subsequently leaves the heat exchanger again via an opening in the upper side of the heat exchanger for further processing. It is of importance that the product leaves the heat exchanger with a substantially constant temperature, and that it is prevented that the product in the chamber boils over or is undercooled.

The heat exchanger can be used for all kinds of purposes, such as for instance preparing jam. In that case it should be avoided as much as possible that the fruit breaks down into pieces. Other examples of products are mayonnaise, soft filling for cookies, dairy products, but also ink for printers.

As long as product is supplied and the chamber is full, product will be able to flow out of the opening in the upper side of the heat exchanger. However, when product is no longer supplied the chamber remains virtually full, without the treated product being discharged. The product that is at the top of the chamber has already reached the right temperature, whereas this is not the case for the product at the bottom of the chamber.

According to the fifth aspect the invention provides a method for heating and/or cooling a product in a heat exchanger that comprises a substantially vertically arranged heat exchanging chamber for a liquid product to be heated and/or cooled, wherein at a lower side the chamber has a first through-opening for passage of product from a supply device to the chamber and at an upper side has a second through-opening for passage of product from the chamber to a receiving device, wherein the method comprises the steps of initiating a supply phase, in which product is led from the supply device through the chamber via the first opening, and is subsequently led out of the chamber to the receiving device via the second opening for further processing, characterised in that the method further comprises during the supply phase detecting whether product is being supplied from the supply device, and if not, initiating a recovery procedure comprising a circulation phase, in which product is led out of the chamber via a third opening through the upper side of the chamber and is subsequently led back into the chamber via a fourth opening through the lower side of the chamber, followed by an evacuation phase, in which the product is led out of the chamber via a fifth opening through the lower side, along the direction of gravity, and is subsequently led to the receiving device for further processing. By circulating the product that is left in the chamber after the supply phase has ended, the product that was situated at the lower side of the chamber when the supply phase stopped can still be cooled and/or heated to the correct extent. As a result when evacuating the chamber the product has a substantially homogenous temperature and can be further processed by the receiving device in the same way as product that flowed out of the heat exchanger during the supply phase. Product loss is thus limited.

In one embodiment the first, fourth and/or fifth opening are the same opening. As the supply phase, the circulation phase and the evacuation phase take place consecutively the same opening at the lower side of the heat exchanger can be used for supplying product to the chamber during the supply phase and during the circulation phase, and for discharging product from the chamber during the evacuation phase.

In one embodiment the second and third opening are the same opening. As the supply phase, the circulation phase and the evacuation phase take place consecutively the same opening at the upper side of the heat exchanger can be used for discharging product from the chamber during the supply phase and during the circulation phase. In one embodiment compressed sterile air is supplied to the upper side of the chamber during the evacuation phase.

In one embodiment the heat exchanger is provided with one or more pumps for guiding the product, wherein during the supply phase a first pump is controlled to pump product from the supply device via a supply duct through the first opening. In one embodiment the heat exchanger comprises a second pump which during the evacuation phase is controlled to pump product out of the chamber to the receiving device via a discharge duct through the fifth opening. In that way product is pumped in the correct direction during the supply phase and during the evacuation phase.

In one embodiment during the circulation phase a third pump is controlled to pump product from the third opening via a circulation duct to the first opening, so that product can be supplied from the upper side of the chamber to the lower side of the chamber.

In one embodiment the first, second and third pump are the same pump, wherein said pump is controlled for pumping the product in a first direction during the supply phase and circulation phase, and wherein the pump is controlled for pumping product in an opposite second direction during the evacuation phase.

In one embodiment the heat exchanger comprises one or more controllable closing devices, wherein during the supply phase the method comprises controlling the closing devices for allowing a flow of product from the supply device through the chamber to the receiving device, during the circulation phase controlling the closing devices for allowing a flow of product from the third opening via a circulation duct to the fourth opening, and during the evacuation phase controlling the closing devices for making a product flow possible out of the chamber through the fifth opening to the receiving device. Preferably the controllable closing devices comprise one or more adjustable cocks. In that way it is possible to set product flows with relatively little ductwork, in which relatively little product is left behind after the evacuation phase.

In one embodiment during the circulation phase and/or during the evacuation phase the second and/or third pump have a lower pumping speed than the first pump during the supply phase. Particularly during the supply phase a higher pumping speed is used than during the circulation phase and/or during the evacuation phase. In that way damage to the product due to repetitively pumping it around is reduced.

In one embodiment the heat exchanger is a scraping heat exchanger having rotating scrapers. Such heat exchangers are often used for treating valuable products, such as for instance printer ink, and during the circulation phase help mixing the product within the chamber. During the evacuation phase the scrapers will further be useful in scraping residues of product from off the walls.

During the circulation and/or evacuation phase the speed of rotation of the scrapers preferably is lower than during the regular supply phase, as a result of which the product is damaged less.

In one embodiment the temperature of the product near the fourth through-opening is measured during the circulation phase, and the evacuation phase either is or is not initiated based on the temperature measured. In one embodiment the temperature of the product near the third opening is also measured during the circulation phase, and the evacuation phase is initiated when said temperature equals the temperature measured near the fourth opening.

In one embodiment during or after the recovery phase the method further comprises, rinsing the chamber and/or one or more of ducts through which the product was led with a rinsing agent, wherein the rinsing agent and the product rinsed away with it are led to a residual product tank. Because of the invention less product is lost and as less residue is left in the tank, less scouring water is required to rinse away the residues. Alternatively the rinsed product can be discharged to the sewer. Preferably the rinsing agent comprises a solvent for the product, such as water.

In one embodiment the circulation phase further comprises the step of detecting a temperature near the fourth opening and on the basis thereof adjusting a delivered cooling power and/or heating power of the heat exchanger. Boiling over or undercooling of circulated product can thus be counteracted.

According to a sixth aspect the invention provides a method for heating and/or cooling a product in a number of heat exchangers positioned in series, wherein the above-mentioned method is consecutively carried out for two or more of the heat exchangers.

According to a seventh aspect the invention provides a heat exchanger comprising a substantially vertically arranged chamber for a viscous product to be heated and/or cooled, wherein the chamber is substantially closed off and at a lower side has a first through-opening for passage of product and at an upper side has a second through-opening for passage of product, a supply duct connected to the first opening for the supply of product from a supply device to the first opening during a supply phase and a discharge duct connected to the second opening for the discharge of product to a receiving device, and a supply pump placed in the supply duct and adapted for during the supply phase pumping the product in a first direction, wherein the first direction runs from the supply device to the first opening, characterised in that the heat exchanger further comprises a circulation duct, connected to a third opening at the upper side of the chamber, and to a fourth opening at the lower side of the chamber, a circulation pump that is adapted for pumping product via the third opening and via the circulation duct to the fourth opening, an evacuation duct, connected to a fifth opening at the lower side of the chamber, an evacuation pump that is adapted for pumping product via the fifth opening out of the chamber and via the evacuation duct to the receiving device, and a control device for controlling the heat exchanger, wherein the control device is coupled to at least one of the pumps and adapted for allowing a flow of product from the third opening via the circulation duct to the fourth opening during a circulation phase, and for allowing a flow of product out of the chamber through the fifth opening to the receiving device during the evacuation phase.

In one embodiment the supply pump, the circulation pump and the evacuation pump are the same pump, wherein said pump is adapted for pumping the product in a first direction during the supply phase and circulation phase, and for pumping product in a second direction opposite the first direction during the evacuation phase.

In one embodiment one or more controllable closing devices are placed in the supply duct, the discharge duct, the circulation duct and the evacuation duct, wherein the one or more controllable closing devices are coupled to the control device.

In one embodiment the first, fourth and/or fifth opening in the lower side of the chamber are the same opening. In one embodiment the second and third opening at the upper side of the chamber are the same opening.

In one embodiment the circulation duct and the evacuation duct are the same duct, which duct with a first end is connected to the supply duct and with a second end is connected to the discharge duct. In one embodiment the supply pump is placed between the first opening and the connection of the first end of the duct.

In one embodiment the heat exchanger further comprises rotatable scrapers for, when operational, at least partially scraping the side walls of the chamber.

In one embodiment the heat exchanger further comprises a temperature sensor for measuring the product temperature near the third opening, wherein the control device is adapted for adjusting a delivered power of the heat exchanger on the basis of the temperature measured. Particularly during the circulation phase this helps preventing the product from boiling over or undercooling.

Summarising the invention according to the sixth and seventh aspects relates to a method and device for heating and/or cooling a liquid product from a heat exchanger having a vertically arranged heat exchanging chamber, wherein when no more product is supplied at the lower side of the heat exchanger from a supply device a product recovery procedure is started. In a preferred embodiment during the recovery phase use is made of a circulation duct that is connected to a supply duct and to a discharge duct of the heat exchanger, wherein during a circulation phase and during an evacuation phase the product is passed through a lower side of the heat exchanger via the circulation duct to a receiving device.

According to an eighth aspect the invention provides a heat exchanger assembly comprising several heat exchangers as described above positioned in series. In that way for instance heating a product in a first heat exchanger can be effected and subsequently a cooling of the product in a second heat exchanger.

The aspects and measures described in this description and the claims of the application and/or shown in the drawings of this application may where possible also be used individually. Said individual aspects, such as the detachable inner cylinder, the circumferential space, the tangential output, and recovering product, and other aspects may be the subject of divisional patent applications relating thereto. This particularly applies to the measures and aspects that are described per se in the sub claims.

SHORT DESCRIPTION OF THE DRAWINGS

The invention will be elucidated on the basis of a number of exemplary embodiments shown in the attached drawings, in which.

DETAILED DESCRIPTION OF THE DRAWINGS

Figure 1A:
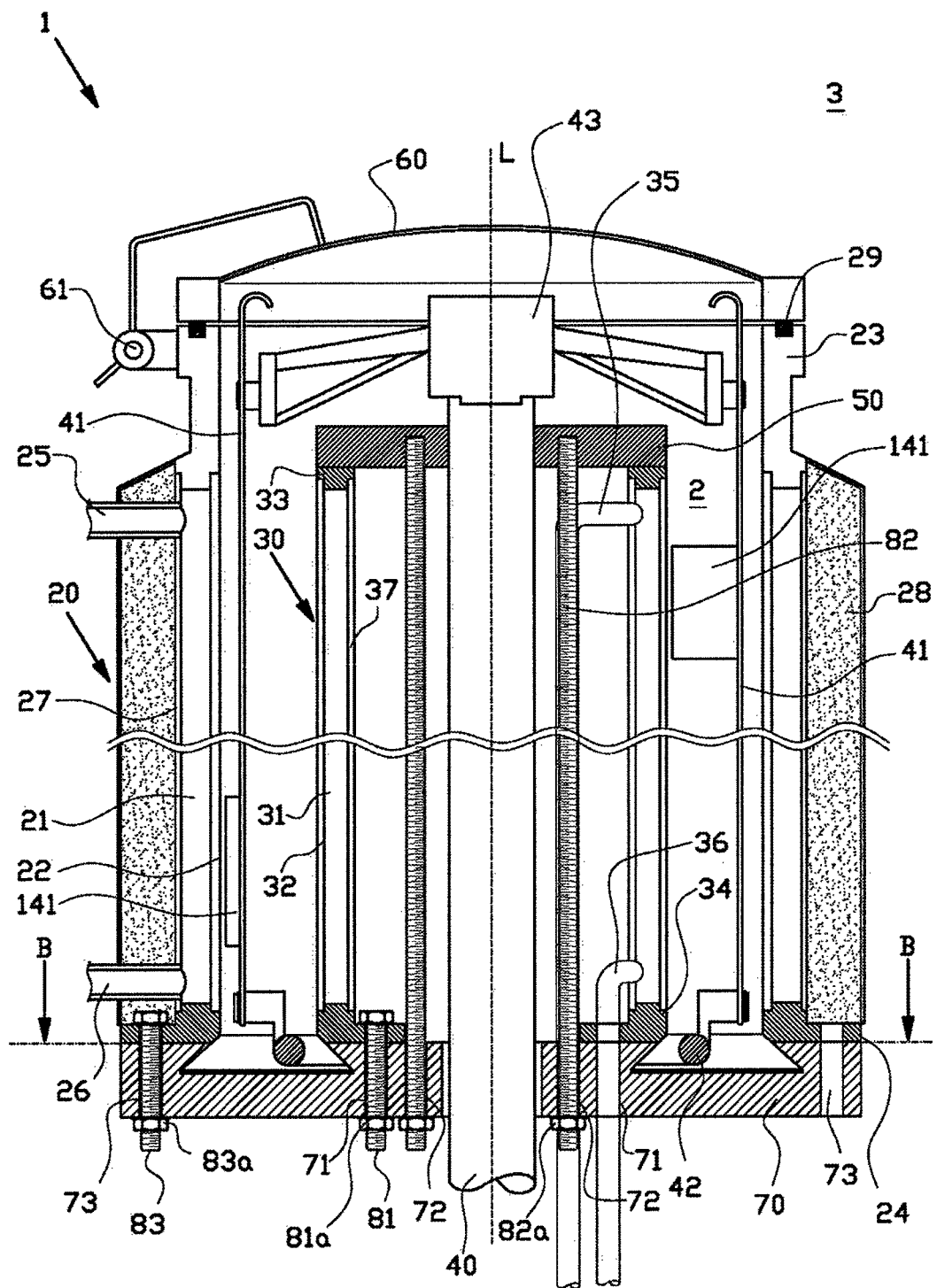
FIG. 1A shows a view in longitudinal section of a scraping heat exchanger with detachable inner cylinder according to an embodiment of the invention.

FIG. 1A shows a schematic cross-section of a scraping heat exchanger 1 according to an embodiment of the invention. The heat exchanger 1 comprises an outer cylinder 20 comprising a hollow first wall 21 having a smooth circle-cylindrical inner side 22, and an inner cylinder 30 concentrically positioned within it comprising a hollow second wall 31 having a smooth circle-cylindrical outer side 32, both sides together defining a substantially vertically arranged space 2 for a product to be cooled and/or heated. The heat exchanger further comprises a driving shaft 40 that is positioned in the centre line L of the concentric walls 21, 31, and passes through an upper wall 50 that substantially closes off the inner cylinder 30 at an upper side. The space 2 for the product can thus extend to above the upper wall 50, so that product can leave the heat exchanger 1 for instance via an opening that is not shown in lid 60. The driving shaft 40 is provided with a number of arms 41 that are attached to the driving shaft 40 above the upper wall 50. In operational use of the heat exchanger scraping members 141 are attached to the arms 41, wherein the scraping members 141 are adapted for during rotation of the shaft 40 scraping over the inner side 22 and/or the outer side 32 of the first wall 20 and second wall 30, respectively. At a lower side the arms 41 are attached to a ring 42 that provides stability to the arms and counteracts that they bend excessively and/or oscillate during scraping. At an upper side the arms are connected to the shaft 40 via a coupling piece 43.

The first wall 21 and the second wall 31 are each provided with a supply connection 25, 35 and a discharge connection 26, 36 for supplying and discharging, respectively, a cooling medium and/or heating medium to the interior of the wall 21, 31. In that way thermal energy of the product can be led to the medium through the outer side 32 of the inner cylinder 30 and/or through the inner side 22 of the outer cylinder 20 or from the medium to the product. At its upper side the second wall 30 is closed off by a flange 33, and at a lower side by flange 34, whereas at its upper side and lower side the first wall 20 is closed off by flanges 23 and 24, respectively. At a side 27 facing away from its inner side 22, the first wall 20 is provided with insulating material 28 in order to counteract heat exchange between the first wall 20 and the outer environment 3 of the heat exchanger.

The heat exchanger 1 further comprises a hinging lid 60, shown here in first position, in which it connects to an O-ring 29 at the upper side of the flange 23, so that the lid 60 substantially closes off the upper side of the space 2. The lid 60 is movable to a second position, in which the upper side of the chamber 2 is left substantially open. When the lid is in the second position inspections of and/or servicing activities to the interior of the heat exchanger can easily be carried out.

The lower side of the vertically arranged space 2 is substantially sealed off by a flange 70. The lower side 31 of the inner cylinder 30 connects to the flange 70 and is pushed against the upper side of the flange 70 by means of a bolt and nut connection 81, 81a wherein the bolts 81 extend through through-holes 71 in the flange 70 and through corresponding through-holes in flange 34 of the inner cylinder 30. The flange 70 is furthermore provided with a second series of throughholes 73, for passage of detachable attachment means in the form of bolts 83 that push the lower side 24 of the outer cylinder 20 against the flange 70 when the nuts 83a have been tightened. Through-holes 72 have been disposed in the flange 70 for passing attachment means 82 through for clamping the upper wall 50 against the upper side 33 of the inner cylinder 30. In that case the upper wall 50 is provided at a lower side with holes that are provided with thread for cooperation with the attachment means 82. When the nuts 81a and 82a are loosened the inner cylinder is no longer pushed against the flange 70 by the attachment means 81, 81a and 82, 82a, so that the inner cylinder 30 can be moved. When the nuts 83a are loosened the outer cylinder 20 is no longer pushed against the upper side of the flange 70 by the attachment means 83, 83a and the outer cylinder 20 can easily be detached from the flange 70.

Figure 1B:
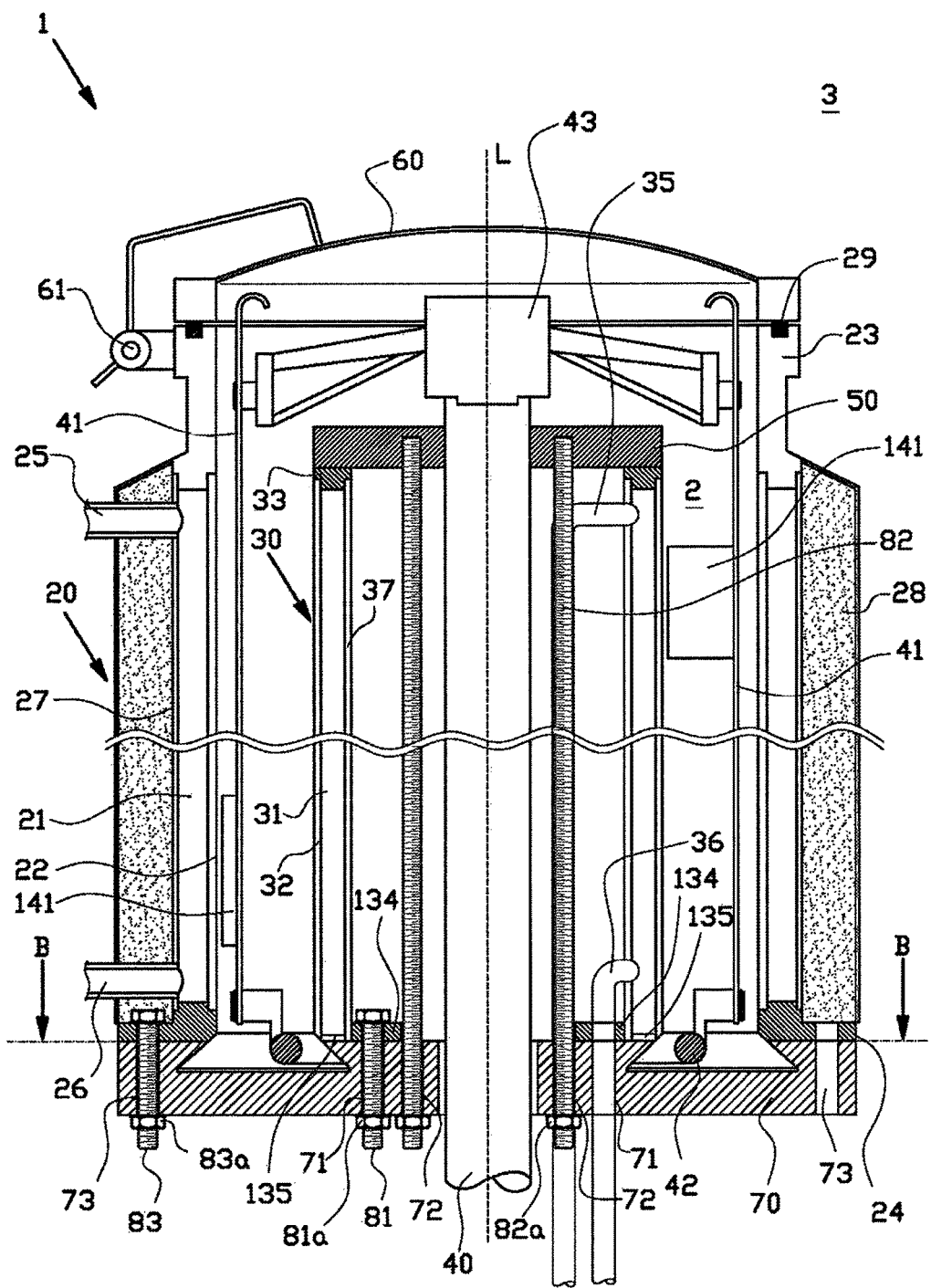
FIG. 1B shows a view in longitudinal section of a scraping heat exchanger with detachable inner cylinder according to another embodiment of the invention.

FIG. 1B shows a schematic cross-section of a scraping heat exchanger 1 according to another embodiment of the invention. The scraping heat exchanger 1 of FIG. 1B differs from the scraping heat exchanger 1 as shown in FIG. 1A in that the inner cylinder 30 abuts directly the upper side of the flange 70 with its lower side 135, whereby the bolts 81 extend through through-holes 71 in the flange 70 and through corresponding through-holes in flange 134 provided at the inner circumference of the inner cylinder 30.

Figure 2A:
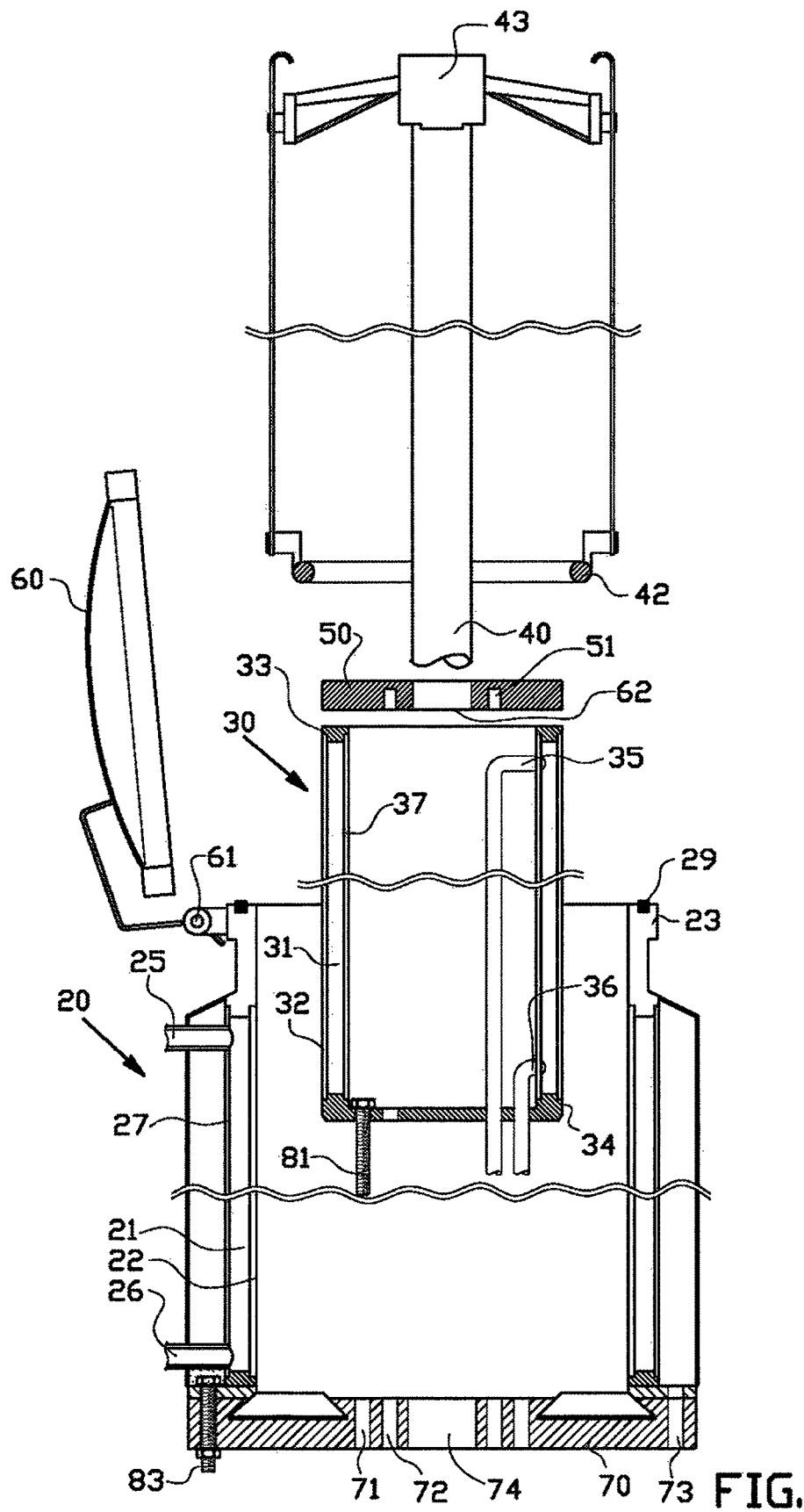
FIG. 2A shows a view in longitudinal section of the heat exchanger of FIG. 1 in disassembled condition, wherein the inner cylinder is detached.

FIG. 2A shows a view in cross-section of the heat exchanger 1 in partially disassembled condition, in which the lid 60 is hinged about hinge 61 and is in the second, open position. The lid 60 leaves an opening at the upper side of the heat exchanger 1 open such that the inner cylinder 30 can be moved through it. The supply connection 35 and the discharge connection 36 of the inner cylinder 30 are uncoupled from the supply duct and discharge duct, respectively, that are situated underneath the flange 70 (not shown). The attachment means 82 visible in FIG. 1A that pushed the upper wall 50 against the upper side of the inner cylinder 30, in FIG. 2 have been detached from the flange 70 from the lower side and therefore no longer visible. The driving shaft 40 has been removed in its entirety from the heat exchanger 1 at the upper side. The nuts 81a at the lower side of the flange 70 have been loosened from the bolts 81. The inner cylinder 30 thus is no longer connected in an attached manner to the flange 70 and can easily be removed from the heat exchanger 1 via the upper side thereof. After placing the same or a new inner cylinder the various attachment means 81, 81a and 82, 82a are secured again from the lower side of the flange 70, as are the supply connection 35 and the discharge connection 36.

Figure 2B:
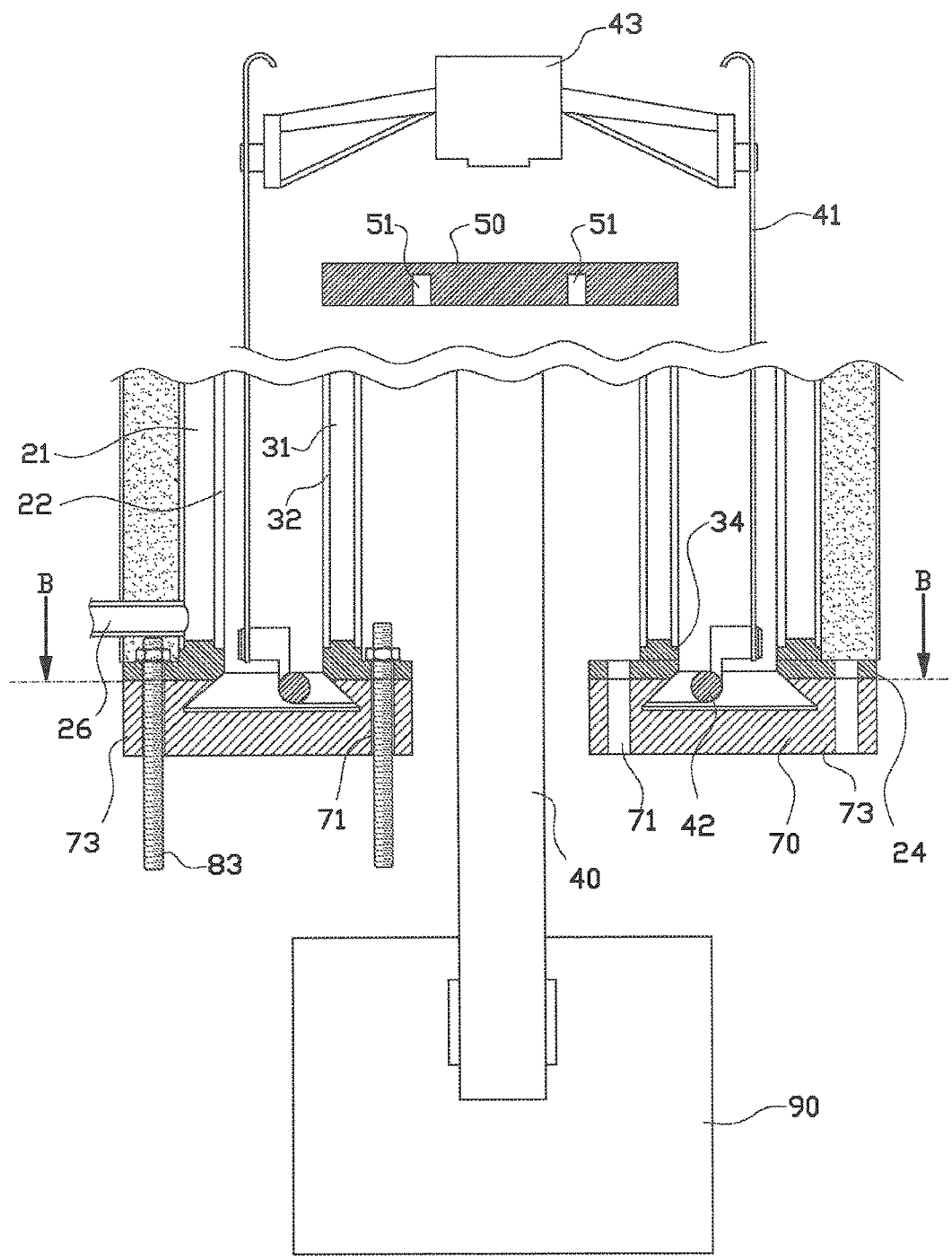
FIG. 2B shows a detail of an embodiment of a scraping heat exchanger, wherein the driving shaft is substantially fixedly connected to a motor.

FIG. 2B shows a detail of an alternative embodiment in which the coupling piece 43 is uncoupled from the shaft 40. The arms 41 that can be attached to the shaft 40 via the coupling piece, have been removed from the heat exchanger together with the coupling piece 43. In that way the driving shaft 40 itself need not be moved with respect to the driving motor 90 when the inner cylinder 30 is removed from the heat exchanger at the upper side. Placing the inner cylinder 30 around the shaft 40 is considerably simplified when the upper wall 50 is detached from the upper side of the inner cylinder prior to moving the inner cylinder 30.

The upper wall of FIG. 2A is provided with an opening 62 for passing the driving shaft 40 through it, wherein between the driving shaft 40 and the upper wall 50 a sealing that is known per se (not shown) is disposed. Such an opening 62 can also be used in the embodiment of FIG. 2B, however in one embodiment the upper wall 50 is made of a non-magnetic material and the end of the driving shaft 40 that faces the upper wall 50 and/or the coupling piece 43 is provided with magnets for effecting a substantially rotation-fixed magnetic coupling between the driving shaft 40 and the coupling piece 43. In this embodiment a through-opening 62 in the upper wall 50 is not required and neither is a sealing.

Figure 3A:
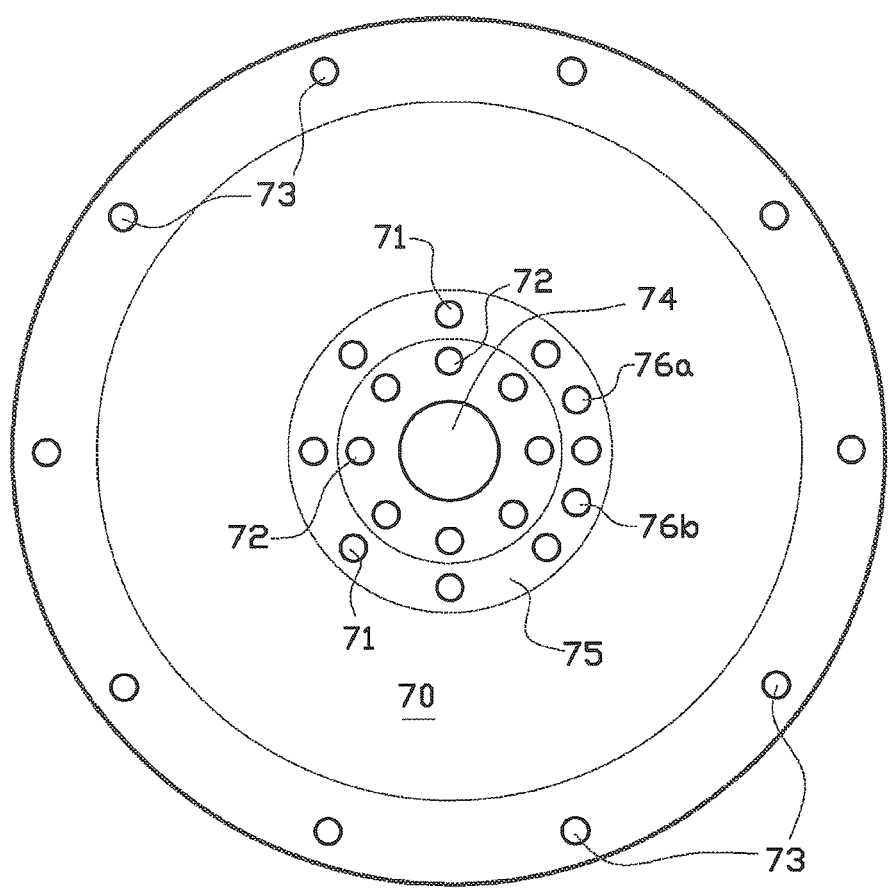
FIG. 3A shows a top view from line B-B of a flange of a heat exchanger according to FIG. 1.

FIG. 3A shows a cross-section of line B-B in FIG. 1. The upper side of the flange 70 is visible, wherein a part of the upper side forms an annular mounting surface 75 in which the holes 71 of the first series of through-holes debouch. Said mounting surface 75 corresponds with the lower side of the inner cylinder 30. Although not shown the mounting surface 75 may comprise grooves or raised edges to guide the lower side of the inner cylinder 30 to the correct position on the flange 70. The second series of through-holes 73, for passage of attachment means for detachable fastening of the outer cylinder 20 to the flange 70 is arranged at the outer edge of the flange 70. The supply connection and discharge connection run through further through-holes 76a, 76b in the flange 70, wherein said holes debouch in the mounting surface 75. The flange is provided with a through-opening 74 from the upper side of the flange 70 to the lower side of the flange and situated inward with respect to the mounting surface, and adapted for freely receiving the driving shaft 40 therein.

The through-holes 72 for the attachment means 82, that clamp the upper wall 50 against the upper side of the inner cylinder 30 are placed outside of the mounting surface 75 and therefore need not be aligned with through-holes in the lower side of the inner cylinder.

Figure 3B:
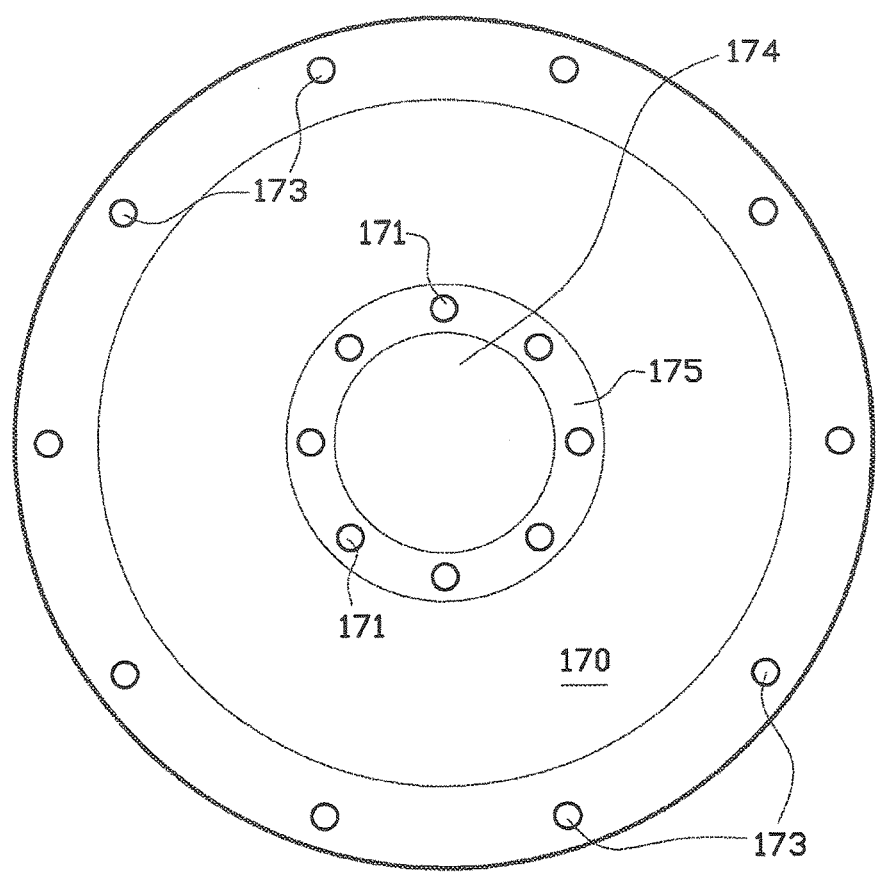
FIG. 3B shows a top view of an alternative embodiment of a flange of a heat exchanger according to the invention.

FIG. 3B shows a top view of a flange 170 of an alternative embodiment of the invention. The flange 170 is provided with a first series of holes 171 for leading attachment means through them in order to push the inner cylinder 30 against the upper side of the flange 170, wherein the holes debouch in a mounting surface 175 at the upper side of the flange. A second series of through-holes 173 is provided at the outer side of the flange in order to allow attachment means through for detachably fastening the outer cylinder. A central through-opening 174 is designed larger than the comparable opening 74 in the flange 70 in FIG. 3A, and offers sufficient room for, in addition to the driving shaft 40, also allowing through the supply connection, the discharge connection and/or attachment means for fastening the upper edge 50.

Figure 4:
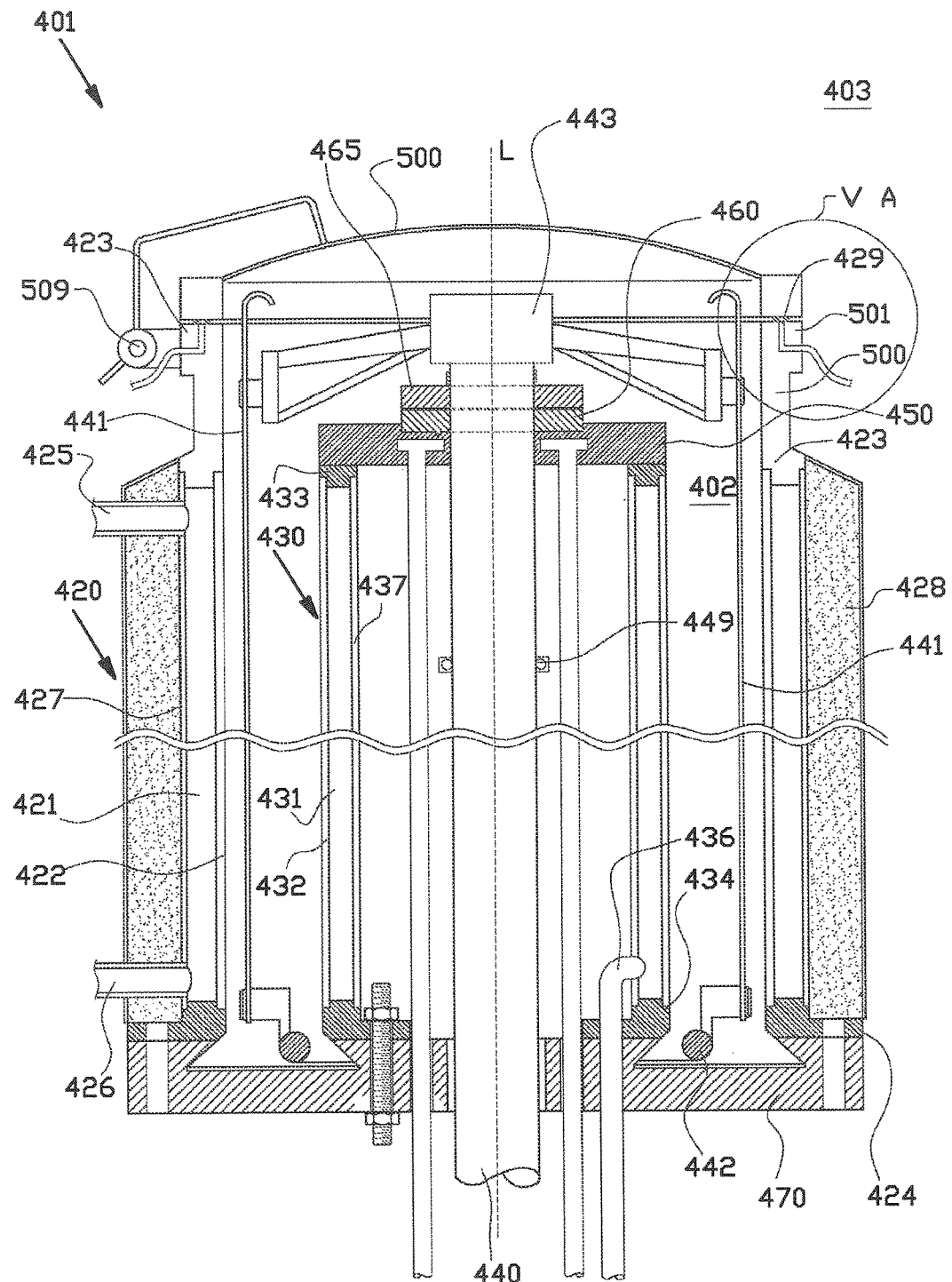
FIG. 4 shows a view in cross-section of a scraping heat exchanger according to a third aspect of the invention.

FIG. 4 shows a schematic cross-section of a scraping heat exchanger 401 according to the third aspect of the invention. The heat exchanger 401 comprises an outer cylinder 420 comprising a hollow first wall 421 having a smooth circle-cylindrical inner side 422, and an inner cylinder 430 positioned stationary concentrically within it comprising a hollow second wall 431 having a smooth circle-cylindrical outer side 432, both sides together defining a vertically arranged space 402 for a product to be cooled and/or heated to a first temperature. The heat exchanger further comprises a driving shaft 440 that is positioned in the centre line L of the concentric walls 421, 431, and is bearing mounted by means of bearing housing 449. The driving shaft 440 passes through an upper wall 450 that substantially closes off the inner cylinder 430 at an upper side 433. The space 402 for the product can in that way extend to above the upper wall 450, so that product can leave the heat exchanger 401, for instance via an opening that is not shown in the lid 500. The driving shaft 440 is provided with a number of arms 441 that are attached to the driving shaft 440 above the upper wall 450. Although not shown, in case of operational use of the heat exchanger scraping members are attached to the arms 441, wherein the scraping members are adapted for during rotation of the shaft 440 scraping the inner side 422 and/or outer side 432 of the first wall 420 and second wall 430, respectively. At a lower side the arms 441 are attached to a ring 442 that provides stability to the arms and counteracts that they bend excessively and/or oscillate during scraping. At an upper side the arms are connected to the shaft 440 via a coupling piece 443 that is detachably attached to the shaft.

The first wall 421 is provided with a supply connection 425 and a discharge connection 426 for supplying and discharging, respectively, a cooling medium and/or heating medium to the interior of the first wall 421. The second wall 431 is provided with a supply connection and a discharge connection for supplying and discharging, respectively, a cooling medium and/or heating medium to the interior of the second wall 431, wherein for reasons of clarity only the discharge connection 436 is shown. In that way thermal energy of the product can be led to the medium through the outer side 432 of the inner cylinder 430 and/or through the inner side 422 of the outer cylinder 420 and vice versa. At its upper side the second wall 431 is closed off by a flange 433, and at a lower side by a flange 434, whereas at its upper side and lower side the first wall is closed off by flanges 423 and 24, respectively. At a side 427 facing away from its inner side 422, the first wall 421 is provided with insulating material 428, in order to counteract heat exchange between the first wall 421 and the outer environment 403 of the heat exchanger. The lid 500 is moveable to a second position, in which the upper side of the chamber 402 is left substantially open. When the lid 500 is in the second position, inspections of and/or servicing activities to the interior of the heat exchanger 401 can easily be carried out. The lower side of the vertically arranged space 402 is substantially sealed off by a flange 470. The lower side 434 of the inner cylinder 430 and the lower side 424 of the outer cylinder 420 are welded to the flange 470.

Figure 5A:
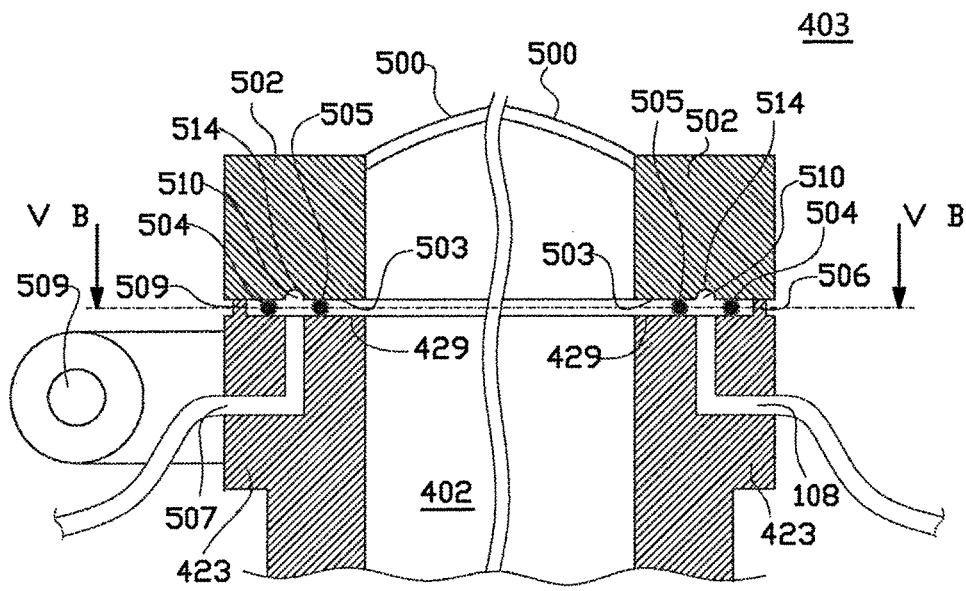
FIGS. 5A and 5B show a detail of an improved sealing for closing off an upper side of the heat exchanger according to the third aspect of the invention.
Figure 5B:
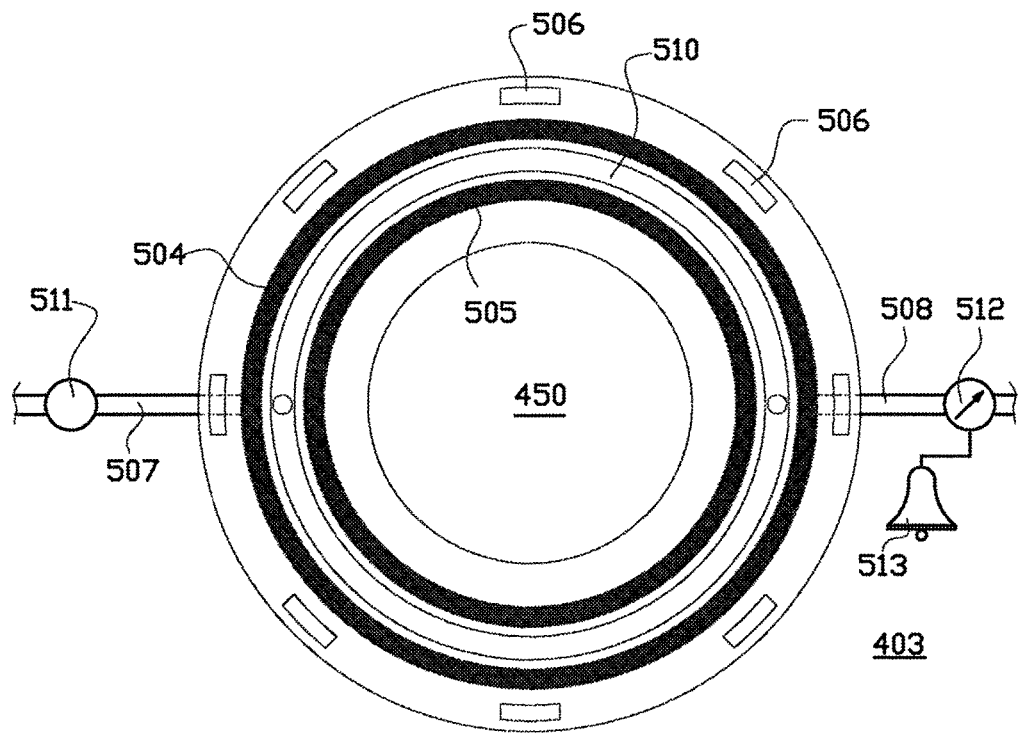

FIGS. 5A and 5B show a detail of an improved sealing between the lid 500 and the first edge 423 wherein a part between the edges is left out, and a schematic view in cross-section through line VB, wherein furthermore a pump 511 and a pressure meter 512 are schematically shown. At its upper side 429 the first edge 423 of the first wall 420 is provided with two annular sealings that are placed concentrically and spaced apart from each other, in this case formed by O-rings 504, 505. At a side of the sealings that faces away from the space 402, the upper side of first edge 423 is furthermore provided with several abutment edges 506 that are adapted for keeping the lower side 503 of the second edge 502 of the lid 500 and the upper side 429 of the first edge 423 spaced apart. Additionally the abutment edges 506 counteract the excessive compression of the sealings 504, 505 when the lid 500 is in the first, closed position. The second edge 502 is furthermore provided with a circumferential groove 514, which, when the lid 500 is in the first position, is placed concentrically between the two sealings 504, 505. In this position the two sealings together with the circumferential groove 514 form a circumferential space 510, through which during operational use a barrier fluid can flow which with respect to the space 502 and the outside 503 of the heat exchanger 401 has been brought under overpressure. A supply duct 507 comprising a through-opening in the first edge 423 from an outside of said edge, debouches in the space 510 and is suitable to let an aseptic fluid flow under overpressure to the circumferential space 510. At an opposite side of the first edge 423, when viewed in a horizontal plane, a discharge duct 508 is formed, which from the circumferential space 510 extends to the outside of the edge 423, and through which the fluid under overpressure that has flowed through the circumferential space 510 can be discharged. The fluid is supplied by a pump 511 to the supply duct 507, while a pressure meter 512 coupled to the discharge duct 508 measures the pressure of the discharged fluid. The pressure meter 512 is connected to alarm means, in this case a bell 513 giving an alarm signal when the measured pressure is not within a predetermined pressure range, for instance when at least one of the sealings 504, 505 does not seal off properly. When during use the more inwardly situated sealing 405 does not function properly, fluid will flow from the circumferential space 510 to the space 402 for product due to the overpressure of the fluid. When during use the more outwardly situated sealing 504 does not function properly, fluid will flow from the circumferential space 510 to the outside 403 of the heat exchanger 401 due to the overpressure of the fluid. In both cases it is prevented that air can flow from the space 402 for the product to the outside 403 of the heat exchanger 401 and vice versa. The space 402 thus remains aseptically closed off from the outside of the heat exchanger 401.

Figure 6A:
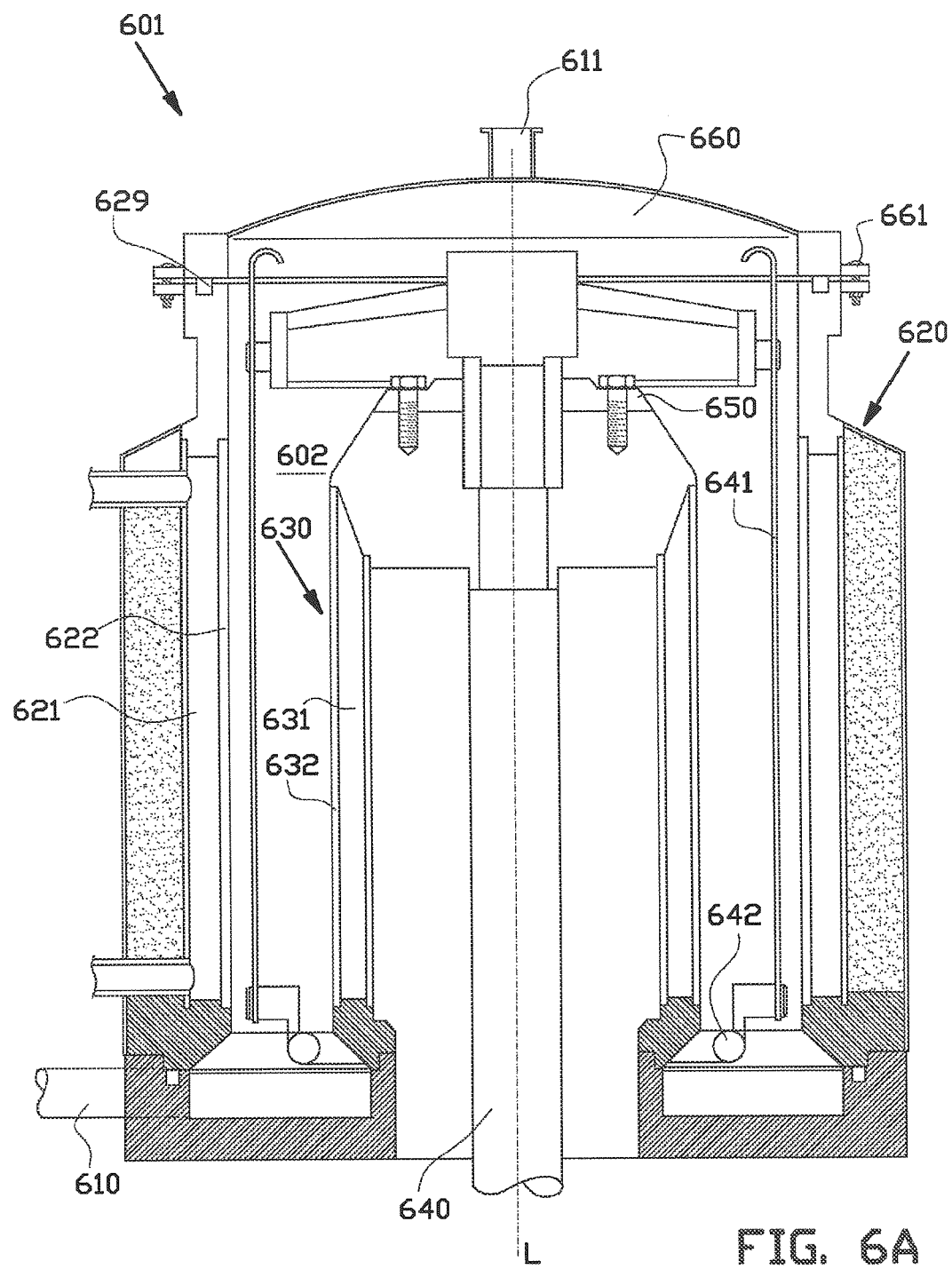
FIGS. 6A, 6B, 6C and 6D show a view in longitudinal section of a known scraping heat exchanger, a more schematic view thereof, a top view of the heat exchanger, and a view in cross-section of the supply connection, respectively.

FIG. 6A shows a schematic longitudinal section of a known scraping heat exchanger 601. The scraping heat exchanger 601 comprises an outer cylinder 620 with a first wall 621 having a smooth circle-cylindrical inner side 622, and an inner cylinder 630 positioned concentrically within it comprising a second wall 631 having a smooth circle-cylindrical outer side 632, wherein both sides 622, 632 together define a vertically arranged space 602 for a product to be cooled and/or heated.

The heat exchanger can be used for all kinds of purposes, such as for instance preparing jam. In that case it should be avoided as much as possible that the fruit breaks down into pieces. Other examples of products are mayonnaise, soft filling for cookies, dairy products, but also ink for printers.

A driving shaft 640 that is positioned in the centre line L of the concentric walls 621, 632, and passes through an upper wall 650 that substantially closes off the inner cylinder 630 at an upper side, comprises a number of arms 641, that are attached to the shaft 640 above the upper wall 650, wherein scraping members (not shown) are attached to the arms 641, which scraping members are adapted for during rotation of the shaft 640 scraping over the inner side 622 and/or outer side 632. The scrapers thus help in giving the product flow in the space 602 a radial component that moves along with the rotary direction of the shaft 640. At the upper side of the space 602 the heat exchanger 601 comprises a lid 660. The lid 660 is in this case shown in a closed position in which it substantially closes off the space 602 at an upper side and is pushed against an O-ring 629 placed between the lid and the outer cylinder 620 by means of coach bolts 661. At the lower side of the heat exchanger 601 a tubular supply connection 610 for supply of the product to be heated and/or cooled debouches in the space. In horizontal projection, that means projected in a horizontal plane, said tube 610 debouches tangentially in the space 602, so that the product flow acquires a component of velocity moving with the scrapers when it enters the space 602. After the product has been heated and/or cooled it leaves the space 602 via a tubular discharge connection 611 at the upper side of the lid 660.

Figure 6B:
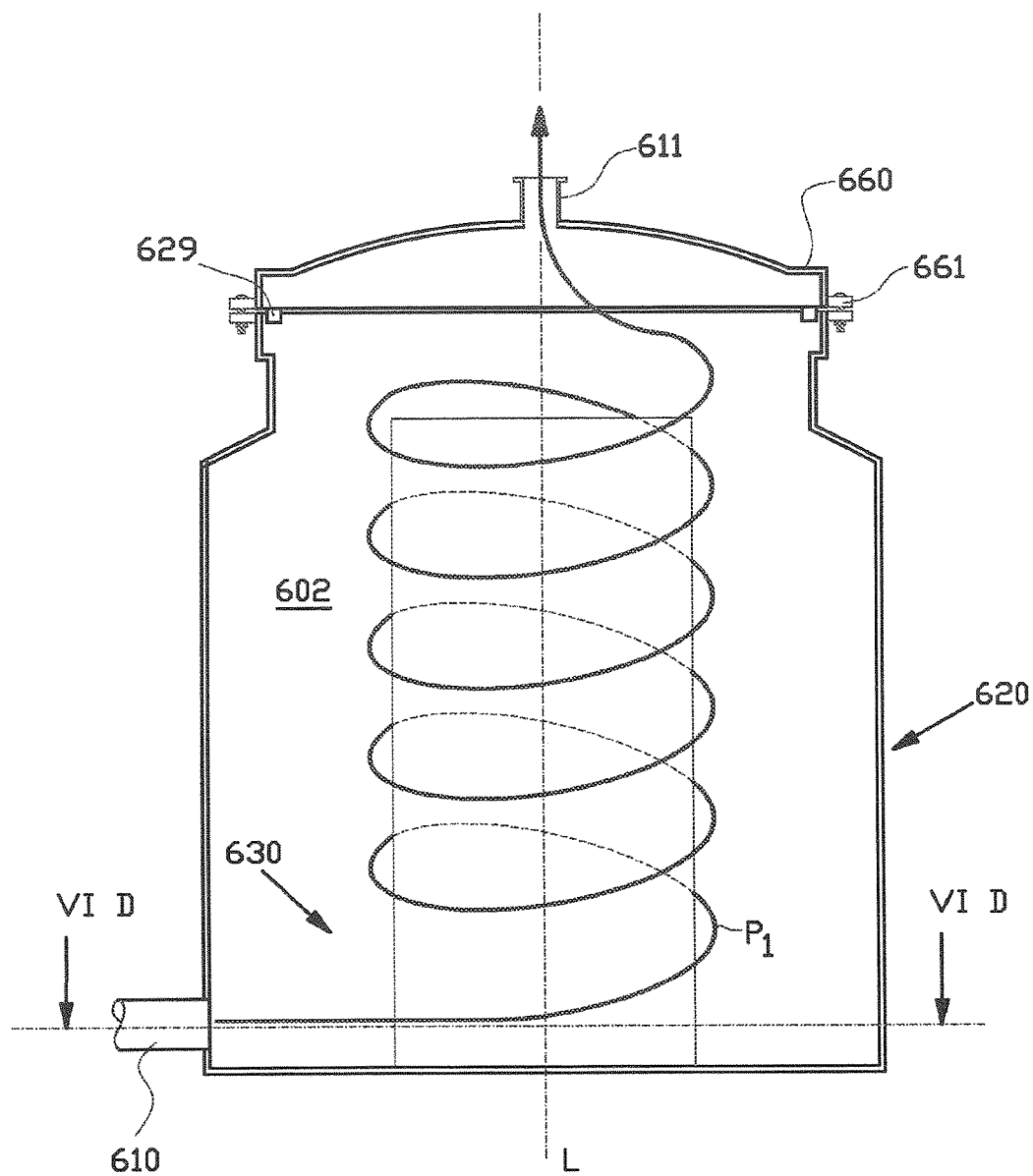

FIG. 6B shows a schematic view of the heat exchanger 601 in which a path P1 of a product flow is indicated which is tangentially supplied at the lower side of the space 602 via supply connection 610 so that the product flow has a radial component of velocity within the space. A further radial component of velocity is given to the product flow by the rotation of the scraper blades (not shown) about the centre line L, wherein said radial component of velocity moves along with the rotary direction of the scrapers. Together with the vertical component of velocity the product flow acquires due to constant supply of product at the supply connection 610 this results in the product flow, at least in the space 602 defined by the inner side and the outer side, following a helical line along P1 extending about the centre line L.

Figure 6C:
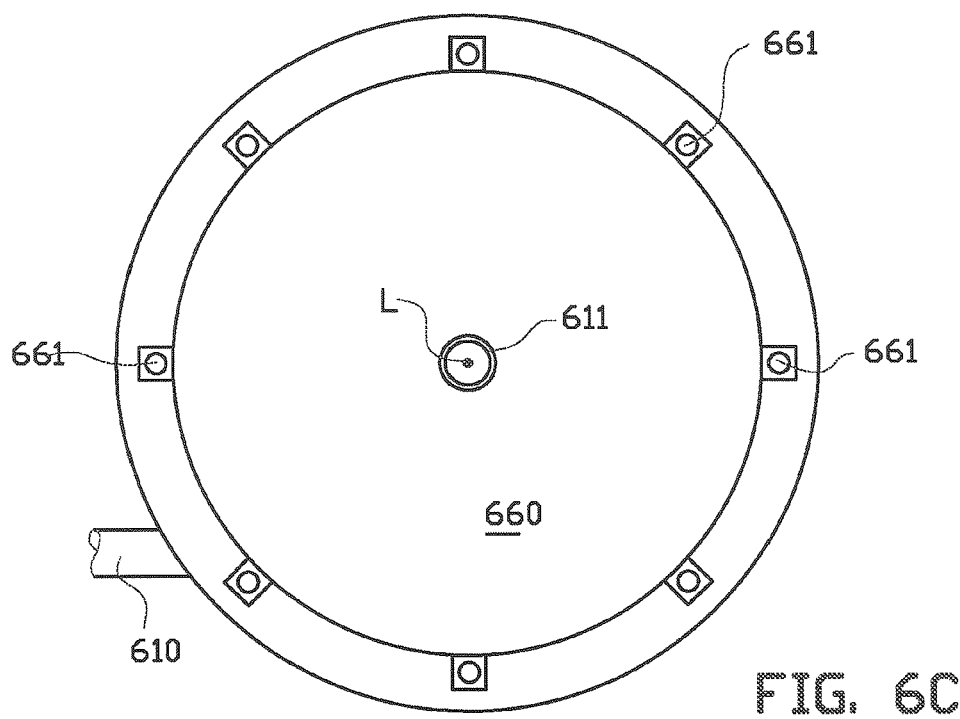

FIG. 6C shows a top view of a lid 660 of the heat exchanger of FIG. 6A, wherein the discharge connection 611 is a part of the lid 660 and is aligned with the centre line L of the concentrically positioned walls. The lid 660 is adapted for in a first closed position, substantially closing off the upper side of the space 602, and in a second, open position, leaving the upper side of the space 602 open, for instance for inspection and servicing purposes. During operational, that means heating and/or cooling, use of the heat exchanger the lid 660 is clamped onto the outer cylinder by means of detachable coach bolts 661.

Figure 6D:
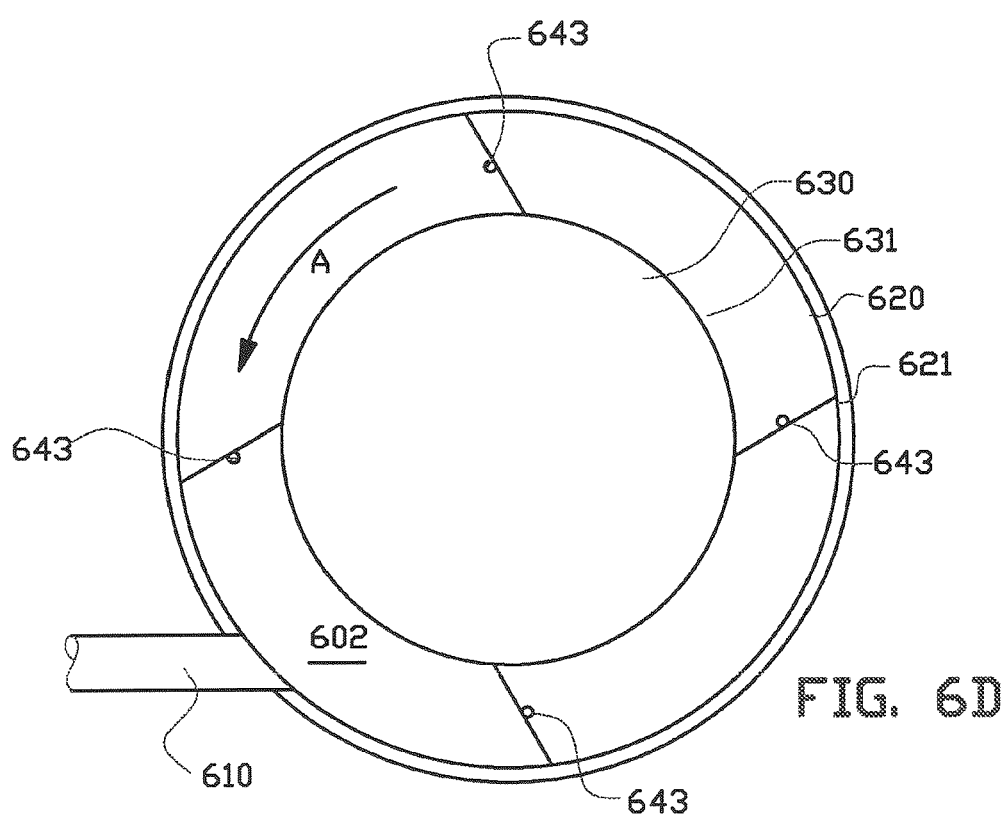

FIG. 6D shows a view in cross-section through line VID-VID in FIG. 6B. The supply connection 610, when viewed in the horizontal plane, is tangentially positioned with respect to the space 602. The scrapers 643, shown schematically here, rotate anti-clockwise in direction "A", so that the product when entering the space 602 is supplied along with the rotary direction of the scrapers.

Figure 7A:
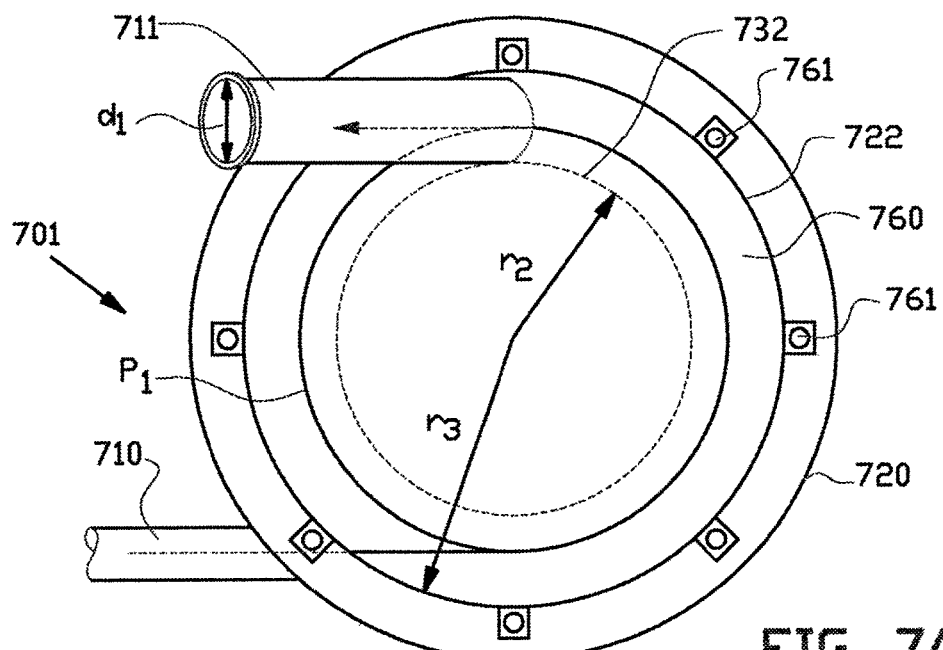
FIGS. 7A and 7B show a top view and a schematic view in cross-section of a heat exchanger with a lid provided with a tangential discharge connection according to a fourth aspect of the invention.
Figure 7B:
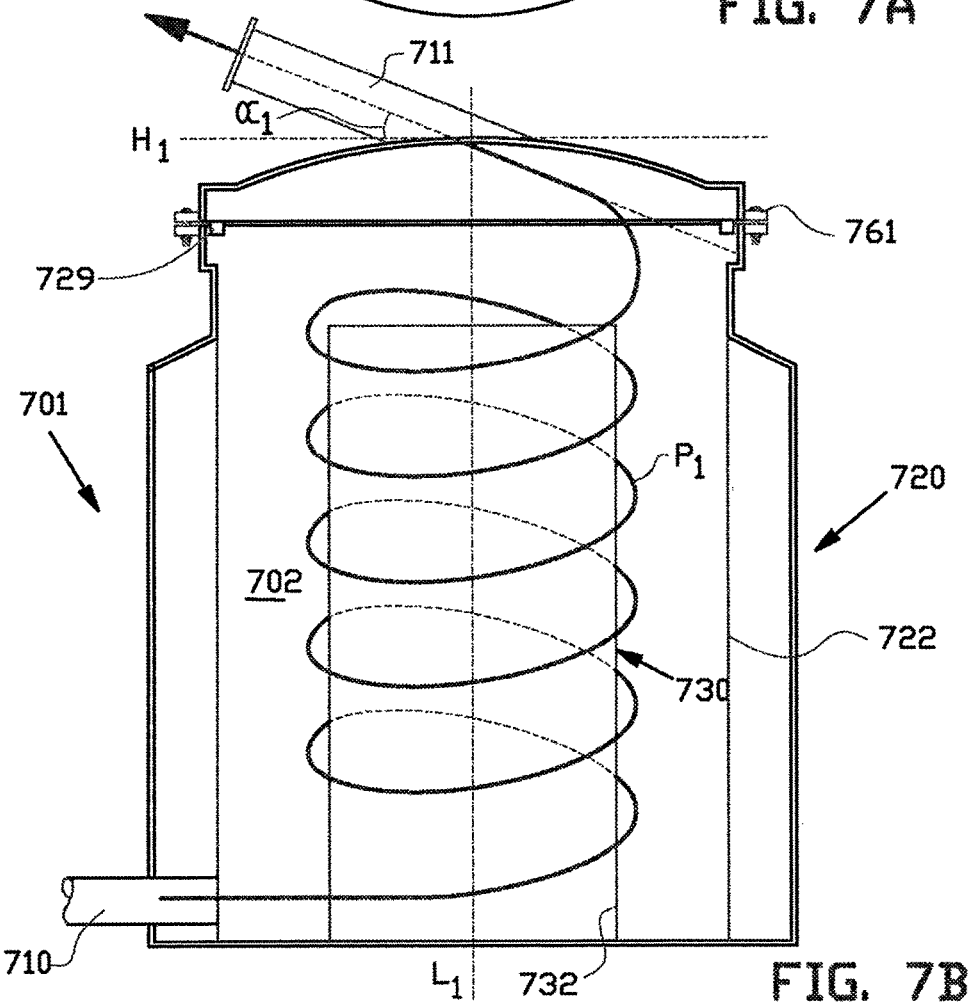

FIG. 7A shows a top view of an upper side of a scraping heat exchanger 701 according to the fourth aspect of the invention having a tubular discharge connection 711 that is a part of the lid 760. Product is supplied to the space 702 at the lower side via supply connection 710. Discharge connection 711, at least when viewed in horizontal projection, tangentially debouches in the space 702, and as shown in FIG. 7B is at an oblique angle of elevation $\alpha 1$ to the horizontal plane H1. The discharge connection 711 here comprises a substantially straight tube 711 that debouches in the lid 760 at the upper side of the heat exchanger 701. The straight tube 711 has an inner diameter d1 that substantially corresponds with a difference between the radius r3 of the inner side 722 of the outer cylinder 720 and the radius r2 of the outer side 732 of the inner cylinder 730, so that no unnecessary narrowing of the product flow is caused that may accelerate the product flow and/or may damage the product when the product flow enters the discharge connection 711. The inner diameter d1 in this case corresponds with the distance of the helical line P1 to the inner side 722 when viewed in the horizontal plane.

In FIG. 7B it can be seen that the discharge connection is at an oblique angle of elevation $\alpha 1$ to the horizontal plane H1, and that the product flow from the lower side of the space to the upper side of the space 702, at least partially follows a helical line P1. At the upper side of the heat exchanger said helical line P1 ends where the discharge connection 711 debouches in the space 702. When the product flow enters the discharge connection 711, the product flow substantially keeps its direction so that damage as a result of swirls and/or the product flow colliding is substantially counteracted.

Figure 8A:
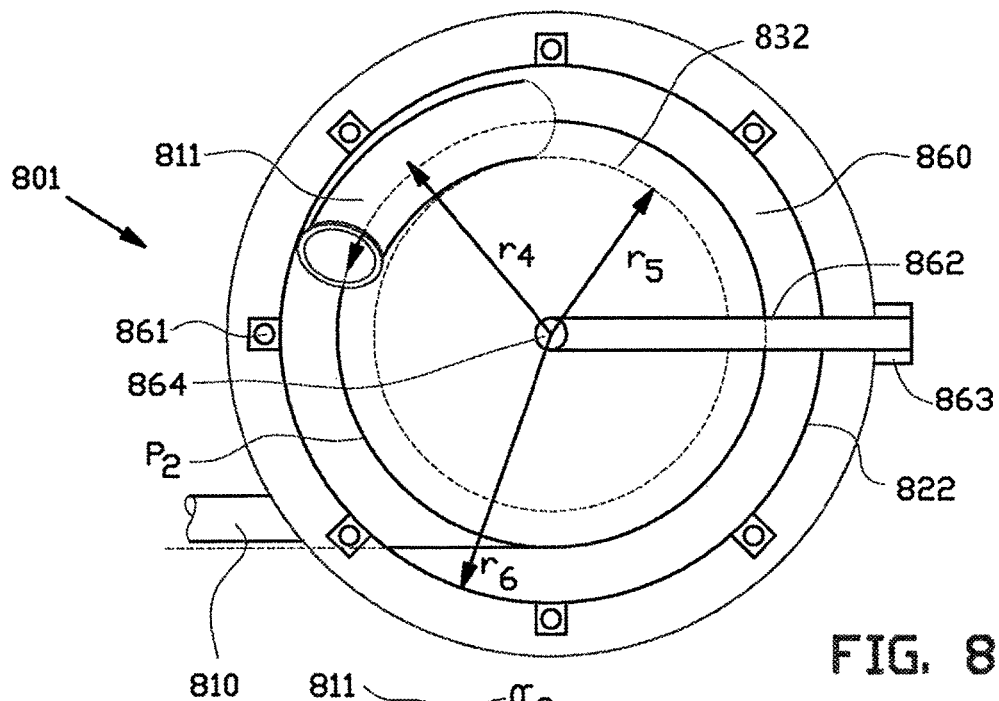
FIGS. 8A and 8B show a top view and a schematic view in cross-section of a heat exchanger with a lid provided with a tangential discharge connection according to a preferred embodiment of the invention.
Figure 8B:
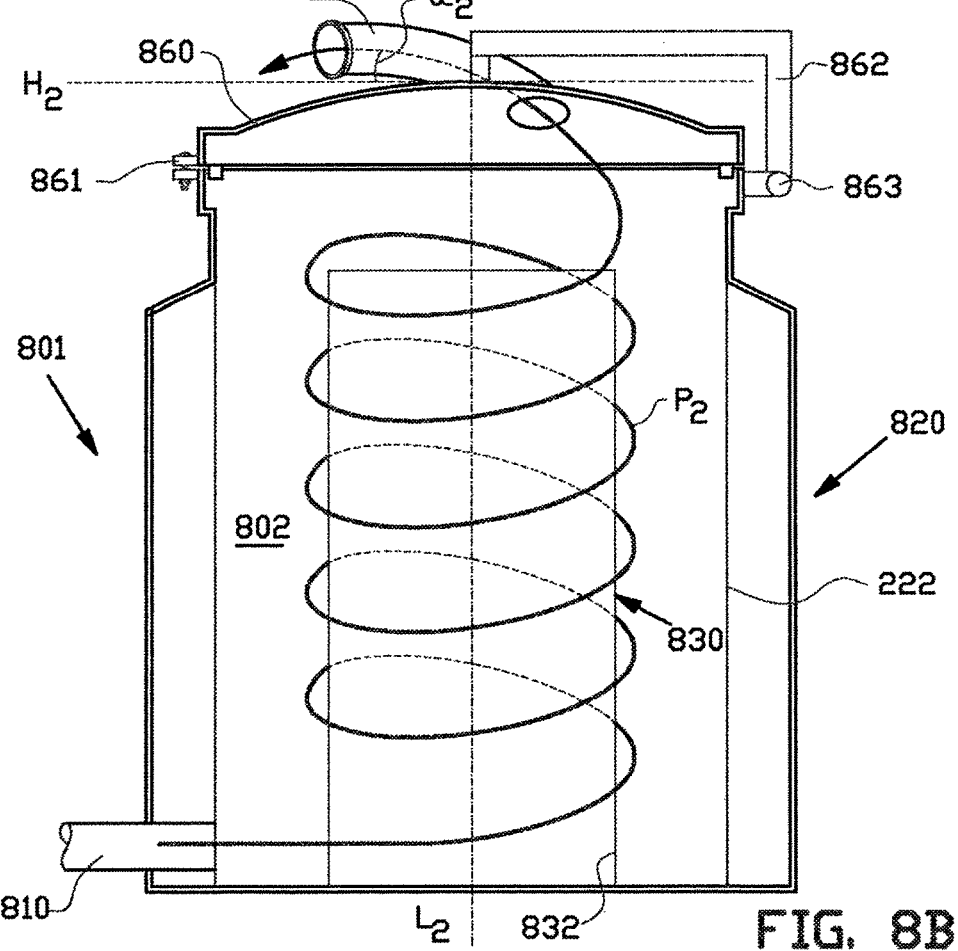

FIG. 8A shows a preferred embodiment of a lid 860 for a heat exchanger 801 according to the invention. At the upper side the lid 860 comprises a discharge connection 811 that follows a helical line P2 that extends about the centre line L2. The discharge connection 811 follows a helical line P2 with a radius r4, which is the average of the radius r5 of the outer side 832 of the inner cylinder 830 and the radius r6 of the inner side 822 of the outer cylinder 820. By means of coach bolts 861 the lid is clamped onto the outer cylinder 620. When the coach bolts are loosened the lid 860 shown here can be rotated about a rotary shaft 864 which, when the lid 860 is in the shown closed position, is arranged in the centre line L2 of the heat exchanger. The rotary shaft 864 is situated at the end of an arm 862 that hinges the lid 860 via a hinge 863 to the outer cylinder 820. Via the rotary shaft 864 the arm 862 is rotatably connected to the lid at an upper side of the lid 860, so that when the coach bolts 861 arranged at the edge of the lid have been loosened, the lid 860 can be rotated about the centre line L2 in order to set an angle of rotation between the supply connection 810 and the discharge connection 811. The discharge connection 811 has an angle of elevation $\alpha 2$ of substantially 20 degrees to the horizontal plane H2.

Figure 9A:
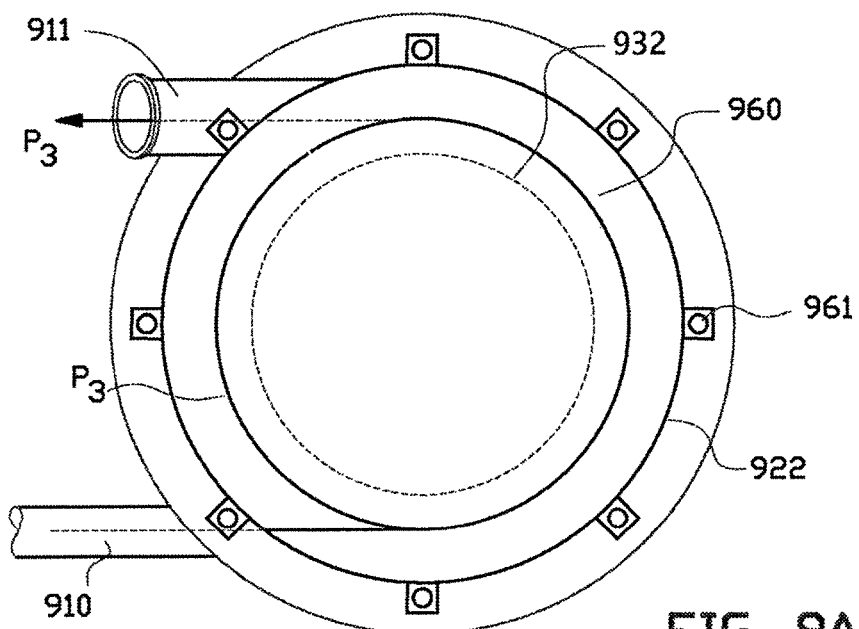
FIGS. 9A and 9B show a top view and a schematic view in cross-section of a heat exchanger with a tangential discharge connection according to the invention.
Figure 9B:
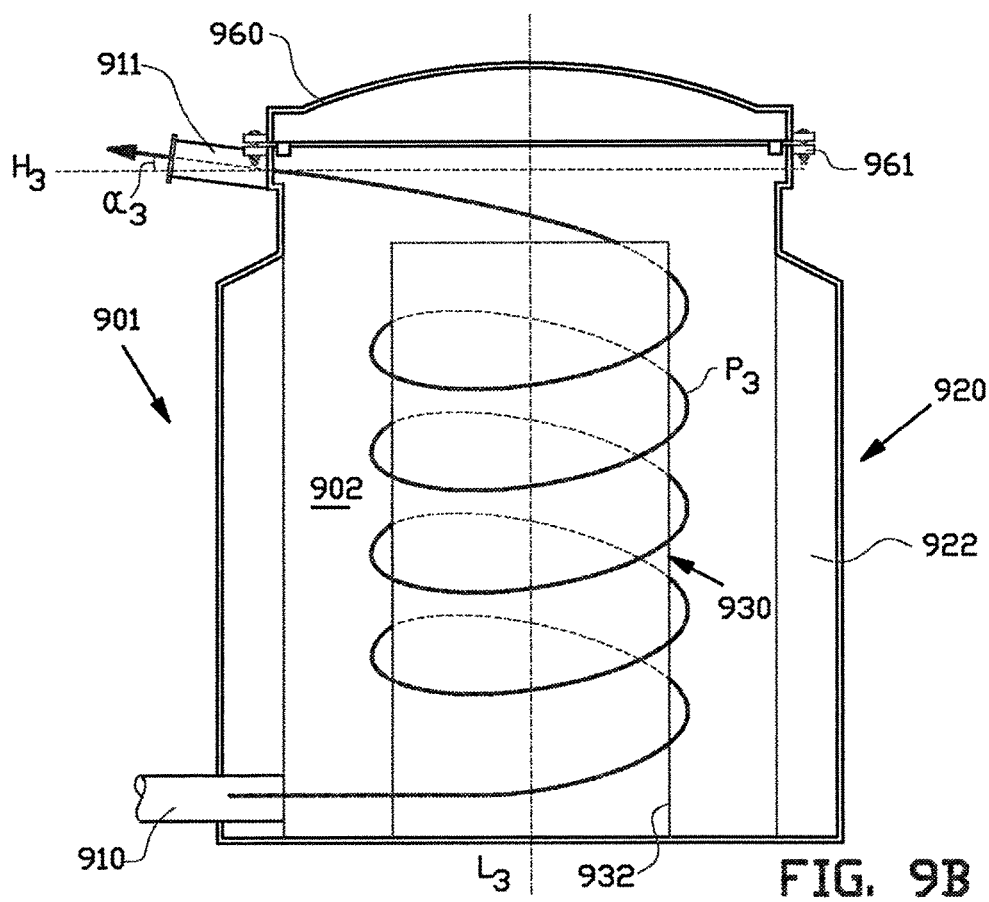

FIGS. 9A and 9B show an alternative embodiment, in which the discharge connection 911 is comprised in the outer cylinder 920 of a heat exchanger 901 and extends through it from an outer side of the outer cylinder 920 to an inner side thereof. It can be seen that the discharge connection 911 at the point where it debouches in the space 902 is at an oblique angle of elevation $\alpha 3$ to the horizontal plane H3, and, at least when viewed in the horizontal plane as shown in FIG. 9A, debouches tangentially in the space 902. A product flow having both a radial and a vertical component can thus flow through the discharge connection with relatively little resistance.

Figure 10:
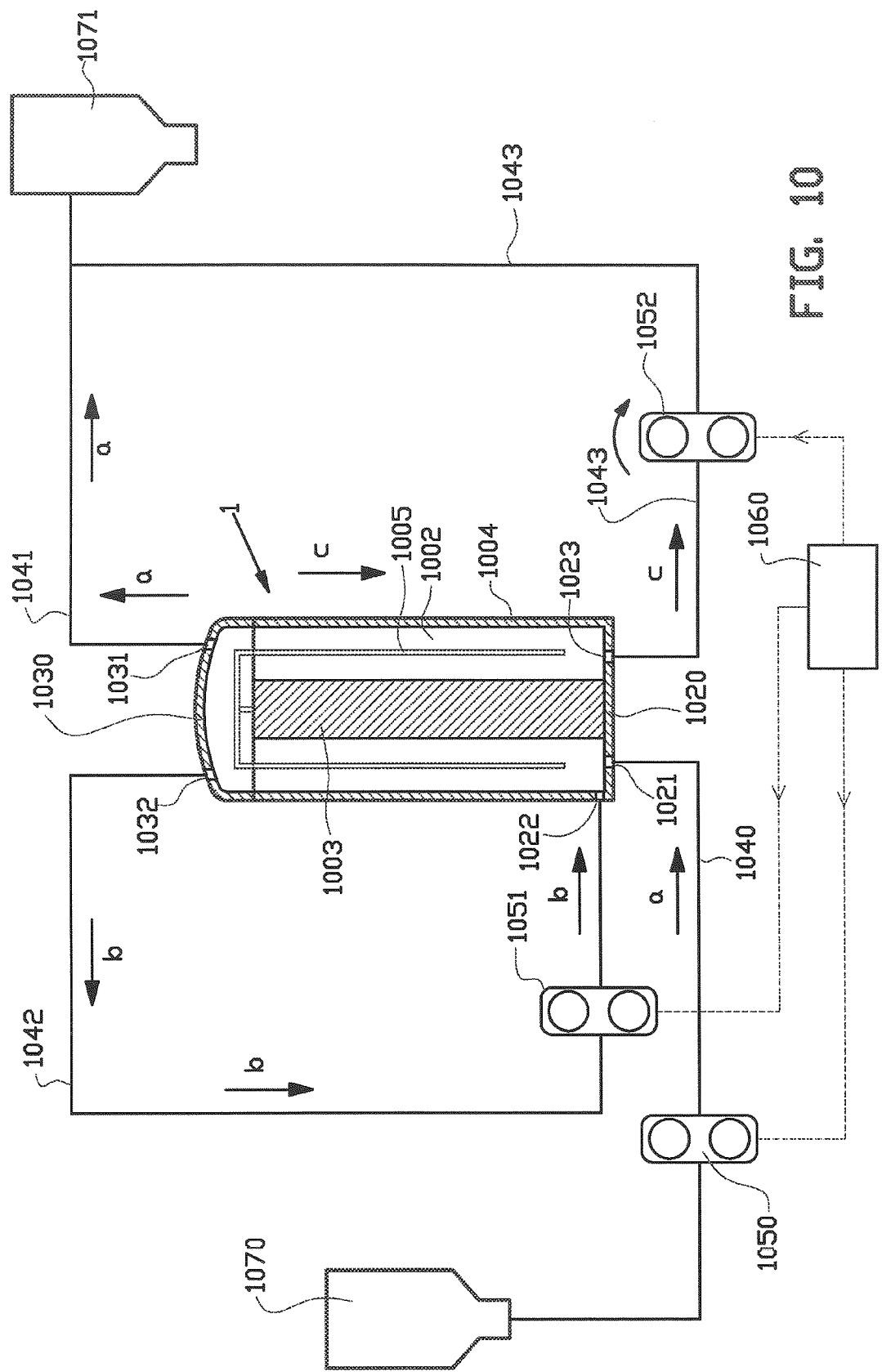
FIG. 10 shows a schematic diagram showing product flows according to a first example of the method according to the fifth aspect of the present invention.

FIG. 10 schematically shows a vertically arranged heat exchanger 1001 according to the fifth aspect of the invention. The heat exchanger 1001 comprises a chamber 1002 for heating and/or cooling a liquid product. Two concentrically positioned cylinders 1003, 1004 define side walls of the chamber, which is furthermore substantially closed off at a lower side 1020 and at an upper side 1030. Arms 1005 project from the upper side of the inner cylinder, which arms are adapted for rotating about the centre line of the inner cylinder and are provided with scrapers (not shown) for at least partially scraping the side walls of the chamber. The heat exchanger further comprises a supply duct 1040 which from a supply device 1070 leads to a first through-opening 1021 at a lower side 1020 of the chamber 1002 for the supply of product thereto. The heat exchanger 1001 further comprises a discharge duct 1041 which from a second through-opening 1031 in the upper side 1030 of the heat exchanger 1001 leads to a receiving device 1071, for leading the product from the upper side 1030 of the chamber to the receiving device 1071. The heat exchanger further comprises a supply pump 1050 which, during a supply phase in which product is supplied from the supply device, is adapted for pumping the product from the supply device 1070 via the first opening 1021 into the chamber 1002. When the chamber 1002 is full this results in product being led out of the chamber at the upper side 1030 of the chamber via the second opening 1031, and subsequently via the discharge duct 1041 to the receiving device 1071. The product then flows in the direction indicated by arrows "a". The supply phase continues until product is no longer supplied from the supply device 1070.

When that is the case, and the chamber 1002 is still filled so that product can still flow from the upper side 1030 of the chamber, a recovery procedure is started that begins with a circulation phase. During the circulation phase the product flows through a circulation duct 1042 via a third through-opening 1032 at the upper side 1030 of the heat exchanger 1001 out of the chamber 1002. Circulation pump 1051 is then placed in the circulation duct for setting the circulation flow, flowing in the direction of the arrows "b", into motion. The product is thus passed back into the chamber 1002 via a fourth through-opening 1022 at the lower side of the chamber 1002. In that way it is achieved that product that was at the bottom of the chamber when the supply phase stopped is also sufficiently heated or cooled. After a predetermined period of time, and/or when a difference in temperature of the product near the opening 1022 and near the opening 1032 is within a predetermined range, the circulation phase is ended. The product in the heat exchanger then has a substantially homogeneous temperature, after which the evacuation phase can start.

In the evacuation phase the product, along with gravity, is pumped out of a fifth through-opening at the lower side of the chamber 1002. Pumping takes place by the evacuation pump 1052, which pumps the product also via an evacuation duct 1043 to the receiving device 1071, where the product can be processed further in a regular manner. The supply pump 1050, the circulation pump 1051 and evacuation pump 1052 are connected to a control device 1060, which switches the pumps on and off during the corresponding phases in order to effect the product flows a, b and c.

Although not shown the supply duct 1040, the discharge duct 1041, the circulation duct 1042 and/or the evacuation duct 1043 preferably are provided with controllable closing devices adapted in order to counteract that another product flow than flows a, b and c are in the supply phase, circulation phase and discharge phase, respectively. Said controllable closing devices preferably are also controlled by the control device 1060.

Figure 11:
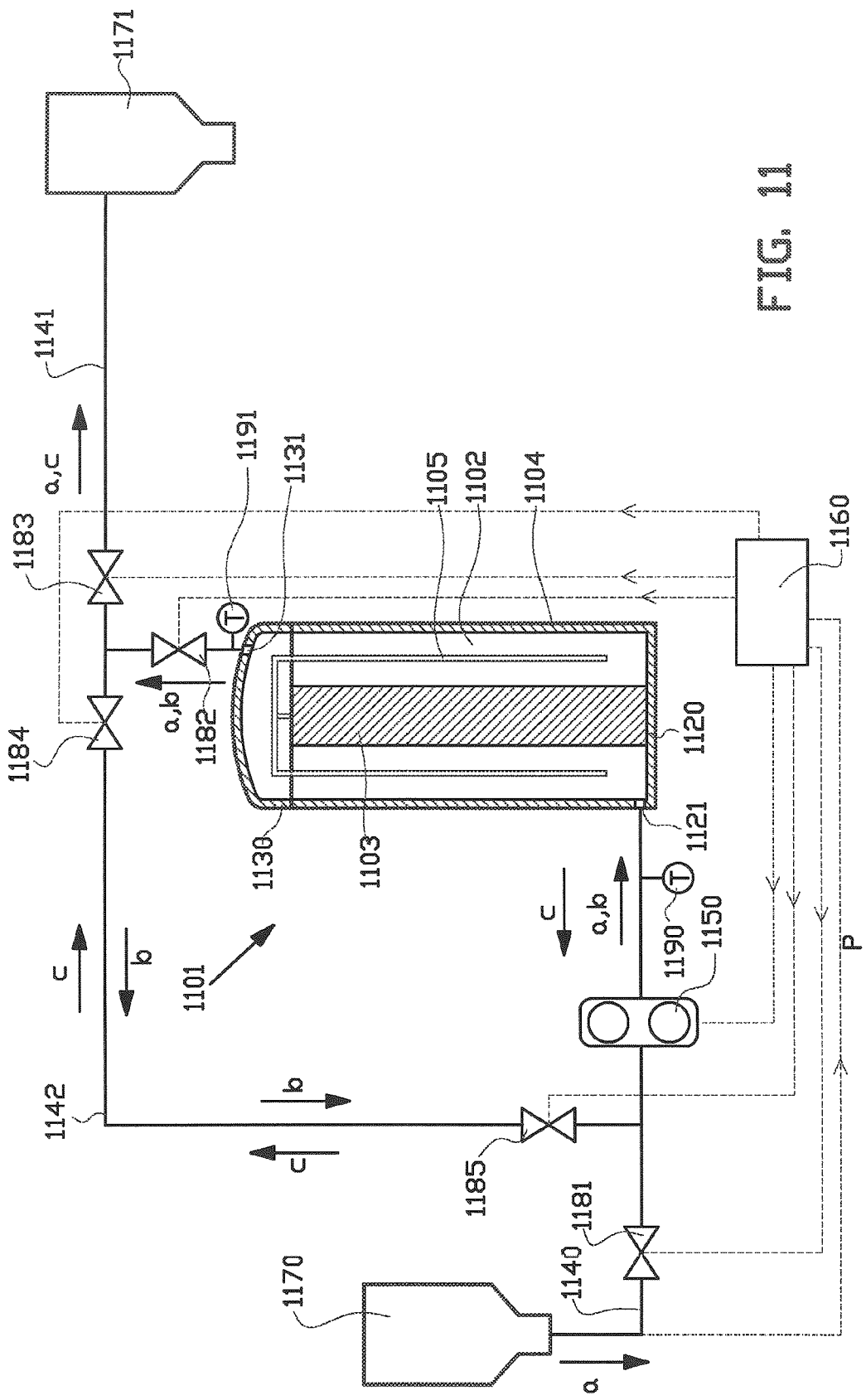
FIG. 11 shows a schematic diagram showing a product flow according to a second example of the method according to the invention.

FIG. 11 shows a second exemplary embodiment of a vertically arranged heat exchanger 1101 with a chamber 1102 for heating and/or cooling a liquid product. Two concentrically positioned cylinders 1103, 1104 define side walls of the chamber 1102, that are further substantially closed off at a lower side 1120 and at an upper side 1130. The arms 1105, that project from the upper side of the inner cylinder, are adapted for rotation about the centre line of the inner cylinder and are provided with scrapers (not shown) for at least partially scraping the side walls of the chamber. The scraping heat exchanger 1101 further comprises a supply duct 1140 which from a supply device 1170 leads to a first through-opening 1121 in a lower side 1120 of the chamber 1102 for the supply of product thereto. During a supply phase product coming from the supply device is pumped by pump 1050 into the chamber in the direction "a" via a first through-opening at the lower side of the chamber. The product is heated or cooled in the chamber, after which via a second through-opening 1131 it leaves the chamber 1102 again at the upper side, via discharge duct 1141, in the direction of the receiving device 1171. Shown as well is a circulation duct 1142 that is connected to the discharge duct 1141 and to the supply duct 1140. At both ends of the circulation duct 1142 controllable closing devices 1184, 1185 are placed that are controlled by control device 1160 for substantially closing off the circulation duct during the supply phase. In that way during the supply phase no product can flow into the circulation duct 1142 from the supply duct 1140 or from the discharge duct 1141. Controllable closing device 1181 placed between the supply device and the connection of the circulation duct to the supply duct, controllable closing device 1182 placed between the opening 1131 and the discharge duct 1141, and controllable closing device 1183 placed in the discharge duct downstream from controllable closing device 1182, during the supply phase are controlled by control device 1160 for substantially being in open position. The supply device 1170 is adapted for sending a signal P to control device 1160, wherein the signal P indicates whether or not product is still supplied from the supply device. As soon as this is no longer the case a recovery procedure is started which begins with a circulation phase.

During the circulation phase the closing devices 1182, 1184 and 1185 are controlled by the control device 1160 to be open, and closing devices 1181 and 1183 are controlled to be closed. The pumping speed of the pump 1150 is also reduced, as a result the product is now pumped in the direction "b", albeit at a lower speed than during the supply phase in order to prevent damage to the product that is circulated. During the circulation phase the temperature of the product near the first through-opening 1121 at the lower side 1120 of the chamber 1102 is measured by a sensor 1190. The temperature of the product near the second opening 1131 at the upper side 1130 of the chamber is measured by a sensor 1191.

When the heat exchanger is a heating heat exchanger the controllable closing device 1181 is preferably controlled to be substantially closed during the circulation phase, but not completely closed, so that overpressure in the circulation duct as a result of heating the product can be counteracted. The production line which comprises the ducts, heat exchanger and supply device remains aseptic, i.e. no air from outside is passed into the production line or vice versa. The delivered power of the heat exchanger, based on one of said measured temperatures, or based on a difference in measured temperatures, can be adjusted, particularly be reduced in order to counteract an excessive change of temperature of the product. When the difference in measured temperatures is within a predetermined range, particularly when the temperatures measured by sensor 1190 and sensor 1191 are substantially equal, the end of the circulation phase has been reached and the evacuation phase can be started with.

During the evacuation phase the control device 1160 controls the valves 1181 and 1182 to a substantially closed position. The valves 1183, 1184 and 1185 are controlled to a substantially open position so that a product flow "c" is possible. Said product flow is subsequently set into motion by controlling the pump 1150 to pump product that flows along with gravity via through-opening 1121 out of the chamber 1002, in the direction "c" out of the chamber 1002, wherein the pump 1150 pumps in an opposite direction than during the supply and circulation phases. The product is pumped via the circulation duct 1142 and discharge duct 1141 to the receiving device 1170 for further processing. Preferably an overpressure in the chamber 1102 is counteracted during the evacuation phase by adding sterile air from the upper side of the chamber. In that way the production line remains aseptic.

Due to the invention a chamber full of product, for a large part, for instance up to 80% of the product in the chamber, can be brought at the right temperature as yet under aseptic conditions when no more product is supplied from the supply device 1170.

Heat exchangers with a supply duct and a discharge duct that are already being used can be converted into the embodiment described in FIG. 11 by connecting a circulation duct to these ducts and placing a number of controllable closing devices according to the diagram shown that are controlled by a control device.

Figure 12:
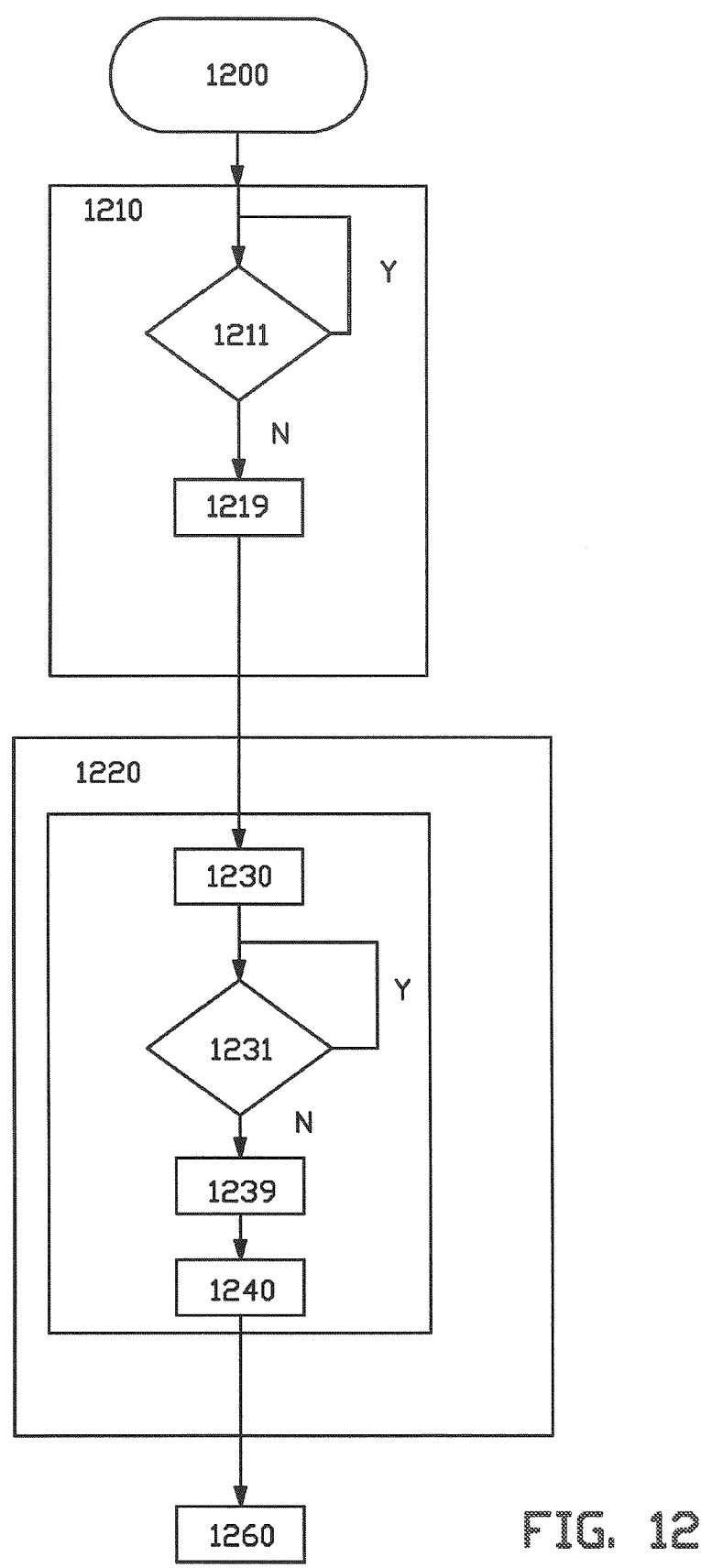
FIG. 12 shows a block diagram for a method according to the invention.

FIG. 12 shows a block diagram of a method for heating and/or cooling a liquid product in a heat exchanger that comprises a substantially vertically arranged heat exchanging chamber for passage of the product, wherein at a lower side the chamber has a first through-opening for passage of the product from a supply device via a supply duct to the chamber and at an upper side has a second through-opening for passage of product from the chamber via a discharge duct to a receiving device. When starting 1200 of the method a supply phase 1210 is initiated, in which the product is led through the chamber from the supply device via the supply duct and the first opening, and is subsequently led from the chamber through the second opening via a discharge duct to the receiving device for further processing.

During the supply phase 1210 it is detected 1211 whether product is supplied from the supply device. When this is not the case, the supply phase has ended 1219 and a recovery procedure 1220 is started. During the recovery procedure 1220 a circulation phase 1230 is started, in which product is led out of the chamber via a third opening through the upper side of the chamber and subsequently via a circulation duct and a fourth opening through the lower side of the chamber is led back into the chamber. Product that was at the bottom of the chamber at the end 1219 of the supply phase is as yet treated in the heat exchanging chamber, so that at the end of the circulation phase the product has a more homogeneous temperature. When the product has circulated a predetermined period of time, or when it is determined that product near the fourth opening has reached a wanted temperature 1231, the circulation phase is stopped 1239 and the evacuation phase 1240 is started with. In the evacuation phase 1240, the product, along with gravity, is led out of the chamber via a fifth opening through the lower side and subsequently via an evacuation duct is led to the receiving device for further processing 1260.

Figure 13:
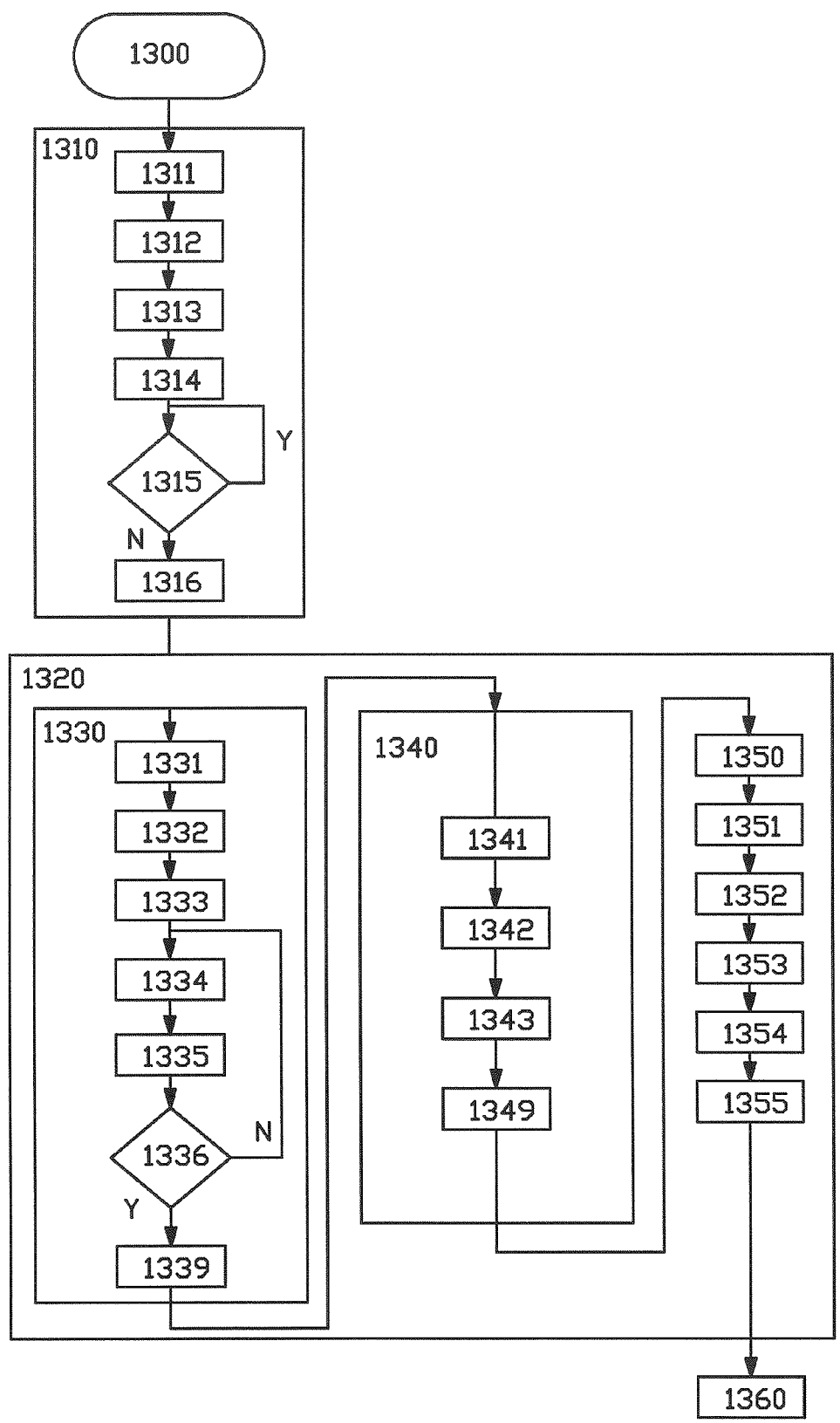
FIG. 13 shows a block diagram for a further method according to the invention.

FIG. 13 shows a block diagram of a method for cooling and/or heating a product in a heat exchanger according to FIG. 11. The first, fourth and fifth openings described above in FIG. 10 are comprised in the same opening 1121 in the lower side of the heat exchanging chamber, and the second and third openings described above in FIG. 10 are comprised in the same opening 1131 at the upper side of the chamber. At an upper side the heat exchanger, that is designed like a scraping heat exchanger with rotating scrapers that are adapted for scraping against the vertical walls that bound the chamber, is provided with a rinsing device (not shown) adapted for after the evacuation phase has ended rinsing the chamber and/or one or more of the ducts through which the product was led clean. Rinsing takes place with a rinsing agent that comprises a solvent for the product.

After starting 1300 the method the supply phase is started 1310 by controlling the supply device to supply product 1311, and by opening 1312 closing devices 1181, 1182, 1183 and closing 1313 closing devices 1184, 1185. The pump 1150 is also controlled 1314 to pump product in the direction of the heat exchanger and thus setting up a product flow "a". In step 1315 it is checked whether product is still supplied from the supply device to the chamber. As long as this is the case the supply phase will continue, otherwise the supply phase is ended 1319 and a recovery procedure 1320 is started with. The recovery procedure starts with a circulation phase 1330, in which the closing devices 1181 and 1183 are closed off 1331 and the closing devices 1182, 1184, 1185 are opened 1332 to make a circulation flow "b" possible. The pump 1150 is controlled 1333 to pump product to the heat exchanger at a lower speed than during the supply phase, thus effecting the circulation flow "b".

The temperature near the opening 1121 at the lower side is measured 1334 by sensor 1190, the temperature near the opening at the upper side is measured 1335 by sensor 1191 and subsequently it is determined 1336 whether the measured temperatures are substantially the same. When this is the case the circulation phase is stopped 1339 and the evacuation phase 1340 is started.

After starting 1340 of the evacuation phase the closing devices 1181, 1182 are closed 1341 and the closing devices 1183, 1184 and 1185 are opened 1342, thus making a product flow "c" possible. The pump 1150 is subsequently controlled 1343 to pump product out of the chamber along with gravity in the direction "c" to the receiving device. After the end of the evacuation phase 1349 the rinsing device at the upper side of the heat exchanger is activated 1350. Closing device 1183 is closed 1351 and closing device 1182 is opened 1352, after which the rinsing agent is supplied 1353 and is circulated 1354 several times through the chamber. Finally the circulated scouring water is discharged 1355.

The above description is included to illustrate the operation of preferred embodiments of the invention and not to limit the scope of the invention. Starting from the above explanation many variations that fall within the spirit and scope of the present invention will be evident to an expert.

The invention claimed is:

1. Scraping heat exchanger comprising an outer cylinder comprising a first wall having a smooth circle-cylindrical inner side, and an inner cylinder positioned concentrically therewithin, comprising a second wall having a smooth circle-cylindrical outer side, wherein both sides together define a substantially vertically arranged space for a product to be cooled and/or heated, further comprising a driving shaft positioned in the center line of the concentric walls, an upper wall that substantially closes off the inner cylinder at an upper side, a number of arms that are coupled to the shaft, wherein scraping members are attached to the arms, which scraping members are adapted for scraping over the inner side and/or outer side during rotation of the shaft, wherein the second wall is designed at least partially hollow and comprises a supply connection and a discharge connection for supplying and discharging, respectively, a cooling medium and/or heating medium and is adapted for the cooling medium and/or heating medium flowing through it,
wherein the heat exchanger further comprises a flange with an upper side, which flange is adapted for abutting a lower side of the inner cylinder with its upper side and for substantially sealing off the lower side of the space, and comprises attachment means adapted for detachably pushing the upper side of the flange against the lower side of the inner cylinder.

2. Scraping heat exchanger according to claim 1, wherein the driving shaft passes through the upper wall and wherein the arms are attached to the shaft above the upper wall.

3. Scraping heat exchanger according to claim 1, wherein the upper wall at a lower side comprises further attachment means extending within the inner cylinder and through through-holes in the flange, wherein said attachment means are adapted for detachably pushing the upper wall against an upper side of the inner cylinder and for being fastened and/or loosened from the lower side of the flange.

4. Scraping heat exchanger according to claim 1, wherein at a side facing away from the flange the outer cylinder comprises a closable opening through which the inner cylinder can be moved.

5. Scraping heat exchanger according to claim 1, further comprising a lid movable to a first position in which it substantially closes off an upper side of the space, and movable to a second position in which it leaves an upper side of the heat exchanger open such that the inner cylinder can be moved through it.

6. Scraping heat exchanger according to claim 1, wherein the attachment means are adapted for being fastened and/or loosened from the lower side of the flange, and for forming a screw joint.

7. Scraping heat exchanger according to claim 1, wherein the flange comprises a first series of through-holes for at least partially passing the attachment means through from an upper side to the lower side of the flange or vice versa.

8. Scraping heat exchanger according to claim 7, wherein the attachment means comprise threaded ends that protrude from the lower side of the inner cylinder and fit through the holes of the first series of through-holes, wherein the attachment means further comprise nuts to screw onto the threaded ends.

9. Scraping heat exchanger according to claim 7, wherein at an upper side the flange comprises a mounting surface for placing the inner cylinder thereon, wherein the first series of through-holes is located in the mounting surface.

10. Scraping heat exchanger according to claim 1, wherein the supply connection and/or the discharge connection protrudes from the lower side of the inner cylinder and extends through one or two further through-holes in the flange, wherein the one or two further through-holes debouch in the mounting surface.

11. Scraping heat exchanger according to claim 1, wherein the outer cylinder is detachably connected to the flange, by means of attachment means which extend from a lower side of the flange through a second series of through-holes in the flange to a lower side of the outer cylinder.

12. Scraping heat exchanger according to claim 1, further comprising a motor for driving the driving shaft.

13. Method for placing an inner cylinder in a heat exchanger on a mounting surface at an upper side of a flange, wherein the flange comprises a first series of through-holes extending from the mounting surface at the upper side of the flange to a lower side of the flange, the heat exchanger comprising an outer cylinder comprising a first wall having a smooth circle-cylindrical inner side, and an inner cylinder positioned concentrically therewithin, comprising a second wall having a smooth circle-cylindrical outer side, wherein both sides together define a substantially vertically arranged space for a product to be cooled and/or heated, further comprising a driving shaft positioned in the centre line of the concentric walls, an upper wall that substantially closes off the inner cylinder at an upper side, a number of arms that are coupled to the shaft, wherein scraping members are attached to the arms, which scraping members are adapted for scraping over the inner side and/or outer side during rotation of the shaft, wherein the second wall is designed at least partially hollow and comprises a supply connection and a discharge connection for supplying and discharging, respectively, a cooling medium and/or heating medium and is adapted for the cooling medium and/or heating medium flowing through it, wherein the heat exchanger further comprises a flange with an upper side, which flange is adapted for abutting a lower side of the inner cylinder with its upper side and for substantially sealing off the lower side of the space, and comprises attachment means adapted for detachably pushing the upper side of the flange against the lower side of the inner cylinder, the method comprising:
placing the inner cylinder on the mounting surface,
from the lower side of the flange detachably fastening attachment means that at least partially extend through the first series of through-holes and are adapted for pushing the lower side of the inner cylinder against the upper side of the flange.

14. Method according to claim 13, wherein the method is carried out while an outer cylinder has been mounted on the flange.

15. Method according to claim 13, wherein said heat exchanger comprises a lid movable to a first position in which it substantially closes off an upper side of the space, and movable to a second position in which it leaves an upper side of the heat exchanger open such that the inner cylinder can be moved through it, wherein said method comprises, prior to the step of placing of said inner cylinder on said mounting surface, a step moving said inner cylinder through said open upper side when the lid is in the second position.

16. Scraping heat exchanger according to claim 5, wherein said lid is moveable to the second position when the inner and outer cylinder are attached to the flange.

17. Scraping heat exchanger comprising an outer cylinder comprising a first wall having a smooth circle-cylindrical inner side, and an inner cylinder positioned concentrically therewithin, comprising a second wall having a smooth circle-cylindrical outer side, wherein both sides together define a substantially vertically arranged space for a product to be cooled and/or heated, further comprising a driving shaft positioned in the center line of the concentric walls, an upper wall that substantially closes off the inner cylinder at an upper side, a number of arms that are coupled to the shaft, wherein scraping members are attached to the arms, which scraping members are adapted for scraping over the inner side and/or outer side during rotation of the shaft, wherein the second wall is designed at least partially hollow and comprises a supply connection and a discharge connection for supplying and discharging, respectively, a cooling medium and/or heating medium and is adapted for the cooling medium and/or heating medium flowing through it,
wherein the heat exchanger further comprises a flange with an upper side, which flange is adapted for abutting a lower side of the inner cylinder with its upper side and for substantially sealing off the lower side of the space, and comprises attachment means adapted for detachably pushing the upper side of the flange against the lower side of the inner cylinder,
wherein at a side facing away from the flange the outer cylinder comprises a closable opening through which the inner cylinder can be moved.

18. Scraping heat exchanger according to claim 17, further comprising a lid movable to a first position in which said lid substantially closes off the closable opening, and movable to a second position in which said lid leaves the closable opening open such that the inner cylinder can be moved through it.

19. Scraping heat exchanger according to claim 3, wherein at a side facing away from the flange the outer cylinder comprises a closable opening through which the inner cylinder can be moved.

20. Scraping heat exchanger according to claim 3, further comprising a lid movable to a first position in which it substantially closes off an upper side of the space, and movable to a second position in which it leaves an upper side of the heat exchanger open such that the inner cylinder can be moved through it.

21. Scraping heat exchanger according to claim 3, wherein the attachment means are adapted for being fastened and/or loosened from the lower side of the flange, and for forming a screw joint.

22. Scraping heat exchanger according to claim 3, wherein the flange comprises a first series of through-holes for at least partially passing the attachment means through from an upper side to the lower side of the flange or vice versa.

23. Scraping heat exchanger according to claim 3, wherein the supply connection and/or the discharge connection protrudes from the lower side of the inner cylinder and extends through one or two further through-holes in the flange, wherein the one or two further through-holes debouch in the mounting surface.

24. Scraping heat exchanger according to claim 3, wherein the outer cylinder is detachably connected to the flange, by means of attachment means which extend from a lower side of the flange through a second series of through-holes in the flange to a lower side of the outer cylinder.

25. Scraping heat exchanger according to claim 3, further comprising a motor for driving the driving shaft.

* * * * *